(12) United States Patent
Deng et al.

(10) Patent No.: US 10,257,687 B2
(45) Date of Patent: *Apr. 9, 2019

(54) METHOD AND APPARATUS FOR PERFORMING NEIGHBOR DISCOVERY

(71) Applicant: InterDigital Patent Holdings, Inc., Wilmington, DE (US)

(72) Inventors: Tao Deng, Roslyn, NY (US); Ravikumar V. Pragada, Collegeville, PA (US); Gregory S. Sternberg, Mt. Laurel, NJ (US); Balaji Raghothaman, Chester Springs, PA (US); Zhuorong Deng, Brooklyn, NY (US); Kiran K. Vanganuru, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/362,295

(22) Filed: Nov. 28, 2016

(65) Prior Publication Data

US 2017/0156046 A1 Jun. 1, 2017

Related U.S. Application Data

(63) Continuation of application No. 14/125,302, filed as application No. PCT/US2012/041515 on Jun. 8, 2012, now Pat. No. 9,510,177.

(Continued)

(51) Int. Cl.
*H04W 4/00* (2018.01)
*H04W 8/00* (2009.01)
(Continued)

(52) U.S. Cl.
CPC ........... *H04W 8/005* (2013.01); *H04W 24/04* (2013.01); *H04W 24/08* (2013.01); *H04W 24/10* (2013.01);

(Continued)

(58) Field of Classification Search
CPC combination set(s) only.
See application file for complete search history.

(56) References Cited

U.S. PATENT DOCUMENTS 6,763,013 B2 7/2004 Kennedy
7,606,175 B1 10/2009 Maufer
(Continued)

OTHER PUBLICATIONS

Algans et al., "Experimental Analysis of the Joint Statistical Properties of Azimuth Spread, Delay Spread, and Shadow Fading," IEEE Journal on Selected Areas in Communications, vol. 20, No. 3, pp. 523-531 (Apr. 2002).

(Continued)

*Primary Examiner* — Frank Duong
(74) *Attorney, Agent, or Firm* — Volpe and Koenig, P.C.

(57) ABSTRACT

A method and apparatus for neighbor discovery in a wireless communication system are disclosed. A neighbor seeking wireless transmit/receive unit (WTRU) may search for a first signal to discover neighbor WTRUs for peer-to-peer communication. The WTRU may then receive the first signal. Further, the WTRU may generate a report based on the received first signal. Then, the WTRU may send a second signal carrying the report to a cellular wireless network. The first signal may include a beacon for neighbor discovery or a synchronization signal or both. The report may contain at least one neighbor WTRU identity or at least a portion of a time value or both. Further, the report may contain a counter value, including at least a portion of a time value. The counter value may be based on a time source. In addition, the first signal may be received from a synchronization source.

20 Claims, 14 Drawing Sheets

Related U.S. Application Data

(60) Provisional application No. 61/565,149, filed on Nov. 30, 2011, provisional application No. 61/495,797, filed on Jun. 10, 2011, provisional application No. 61/495,837, filed on Jun. 10, 2011.

(51) Int. Cl.
*H04W 76/18* (2018.01)
*H04W 24/04* (2009.01)
*H04W 24/08* (2009.01)
*H04W 48/08* (2009.01)
*H04W 48/14* (2009.01)
*H04W 24/10* (2009.01)
*H04W 88/06* (2009.01)

(52) U.S. Cl.
CPC ........... *H04W 48/08* (2013.01); *H04W 48/14* (2013.01); *H04W 76/18* (2018.02); *H04W 88/06* (2013.01)

(56) References Cited

U.S. PATENT DOCUMENTS

| | | | |
|---|---|---|---|
| 8,838,141 | B2 | 9/2014 | Siomina et al. |
| 8,892,115 | B2 | 11/2014 | Zeira et al. |
| 2003/0179742 | A1 | 9/2003 | Ogier et al. |
| 2007/0140163 | A1 | 6/2007 | Meier et al. |
| 2008/0298277 | A1* | 12/2008 | Singh .................. H04L 12/2801 370/255 |
| 2011/0019582 | A1 | 1/2011 | Okmyanskiy et al. |
| 2012/0115518 | A1* | 5/2012 | Zeira ..................... H04W 8/005 455/500 |
| 2014/0057637 | A1 | 2/2014 | Hoang et al. |
| 2014/0241254 | A1 | 8/2014 | Kaur et al. |

OTHER PUBLICATIONS

Fodor et al., "Design Aspects of Network Assisted Device-to-Device Communications," IEEE Communications Magazine, pp. 2-9 (May 2011).
Greenberg, "Toyota Develops an Owner Social Media Platform," (May 25, 2011) available at http://www.mediapost.com/publications/article/151090/ (last visited Dec. 8, 2014).
Huawei et al., "Specification of restricted set of cyclic shifts of root Zadoff-Chu sequences," TSG RAN WG1 Meeting #49, R1-072324, Kobe, Japan (May 7-11, 2007).
Huawei, "Multiple values of cyclic shift increment Ncs," TSG RAN WG1 Meeting #49, R1-072325, Kobe, Japan (May 7-11, 2007).
Jurca et al., "Joint Synchronization, Routing and Energy Saving in CSMA/CA Multi-Hop Hybrid Networks," IEEE International Conference on Mobile Ad-Hoc and Sensor Systems, pp. 245-254 (Oct. 2004).
Kyosti et al., "IST-4-027756 Winner II D1.1.2 V1.2 Winner II Channel Models," Information Society Technologies, D1.1.2 V1.2, pp. 1-82 (Feb. 2008).
Lee et al., "A New Neighbor Discovery Scheme based on Spatial Correlation of Wireless Channel," IEEE Vehicular Technology Conference, pp. 1-5 (Apr. 26-29, 2009).
Sesia et al., "LTE the UMTS Long Term Evolution, From Theory to Practice," John Wiley & Sons, Ltd. (2011).
Third Generation Partnership Project, "Specification Group Radio Access Network; Evolved Universal Terrestrial Radio Access (E-UTRA); User Equipment (UE) procedures in idle mode (Release 9)," 3GPP TS 36.304 V9.10.0 (Mar. 2012).
Third Generation Partnership Project, "Specification Group Radio Access Network; Evolved Universal Terrestrial Radio Access (E-UTRA); User Equipment (UE) proeedures in idle mode (Release 10)," 3GPP TS 36.304 V10.5.0 (Mar. 2012).
Third Generation Partnership Project, "Technical Specification Group Services and System Aspects; Functional stage 2 description of Location Services (LCS) (Release 10)," 3GPP TS 23.271 V10.2.0 (Mar. 2011).
Third Generation Partnership Project, "Technical Specification Group Services and System Aspects; Functional stage 2 description of Location Services (LCS) (Release 7)," 3GPP TS 23.271 V7.10.0 (Dec. 2009).
Third Generation Partnership Project, "Technical Specification Group Services and System Aspects; Functional stage 2 description of Location Services (LCS) (Release 8)," 3GPP TS 23.271 V8.1.0 (Dec. 2009).
Third Generation Partnership Project, "Technical Specification Group Services and System Aspects; Functional stage 2 description of Location Services (LCS) (Release 9)," 3GPP TS 23.271 V9.6.0 (Mar. 2011).
Third Generation Partnership Project, "Technical Specification Group Radio Access Network; Opportunity Driven Multiple Access (3G TR 25.924 version 1.0.0)," 3G TR 25.924 V1.0.0 (Dec. 1999).
Third Generation Partnership Project, "Technical Specification Group SA; Feasibility Study for Proximity Services (ProSe) (Release 12)," 3GPP TR 22.803 V0.3.0 (May 2012).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.9.0 (Sep. 2010).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.10.0 (Jun. 2011).
Third Generation Partnership Project, "Technical Specification Evolved Universal Terrestrial Radio Access (E-UTRA); User Equipment (UE) procedures in idle mode (Release 9)," 3GPP TS 36.304 V9.6.0 (Mar. 2011).
Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.1.0 (Mar. 2011).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.13.0 (Apr. 2011).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.7.0 (Apr. 2011).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.2.0 (Apr. 2011).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.17.0 (Mar. 2012).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.11.0 (Mar. 2012).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.6.0 (Mar. 2012).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.0.0 (Mar. 2012).
Third Generation Partnership Project, "Technical Specification Group Radio Access Network; Feasibility study for Further Advancements for E-UTRA (LTE-Advanced) (Release 9)," 3GPP TR 36.912 V9.3.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.1.0 (Mar. 2011).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 v9.6.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).

Third Generation Partnership Project, "Technical Specification Group Radio Access Network; Evolved Universal Terrestrial Radio Access (E-UTRA); Physical layer procedures (Release 9)," 3GPP TS 35.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.1.0 (Mar. 2011).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).

Third Generation Partnership Project, "Technical Specification Group Services and System Aspects; Functional stage 2 description of Location Services (LCS) (Release 4)," 3GPP TS 23.271 V4.13.0 (Dec. 2004).

Third Generation Partnership Project, "Technical Specification Group Services and System Aspects; Functional stage 2 description of Location Services (LCS) (Release 6)," 3GPP TS 23.271 V6.13.0 (Sep. 2005).

Third Generation Partnership Project, "Technical Specification Group Services and System Aspects; Functional stage 2 description of Location Services (LCS) (Release 5)," 3GPP TS 23.271 V5.13.0 (Dec. 2004).

Third Generation Partnership Project, "Technical Specification Group Radio Access Network; Feasibility study for Further Advancements for E-UTRA (LTE-Advanced) (Release 10)," 3GPP TR 36.912 V10.0.0 (Mar. 2011).

Third Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 9)," 3GPP TS 36.305 V9.6.0 (Mar. 2011).

Third Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 9)," 3GPP TS 36.305 V9.8.0 (Sep. 2011).

Third Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 10)," 3GPP TS 36.305 V10.1.0 (Mar. 2011).

Third Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 10)," 3GPP TS 36.305 V10.3.0 (Sep. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.3.0 (Mar. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).

\* cited by examiner

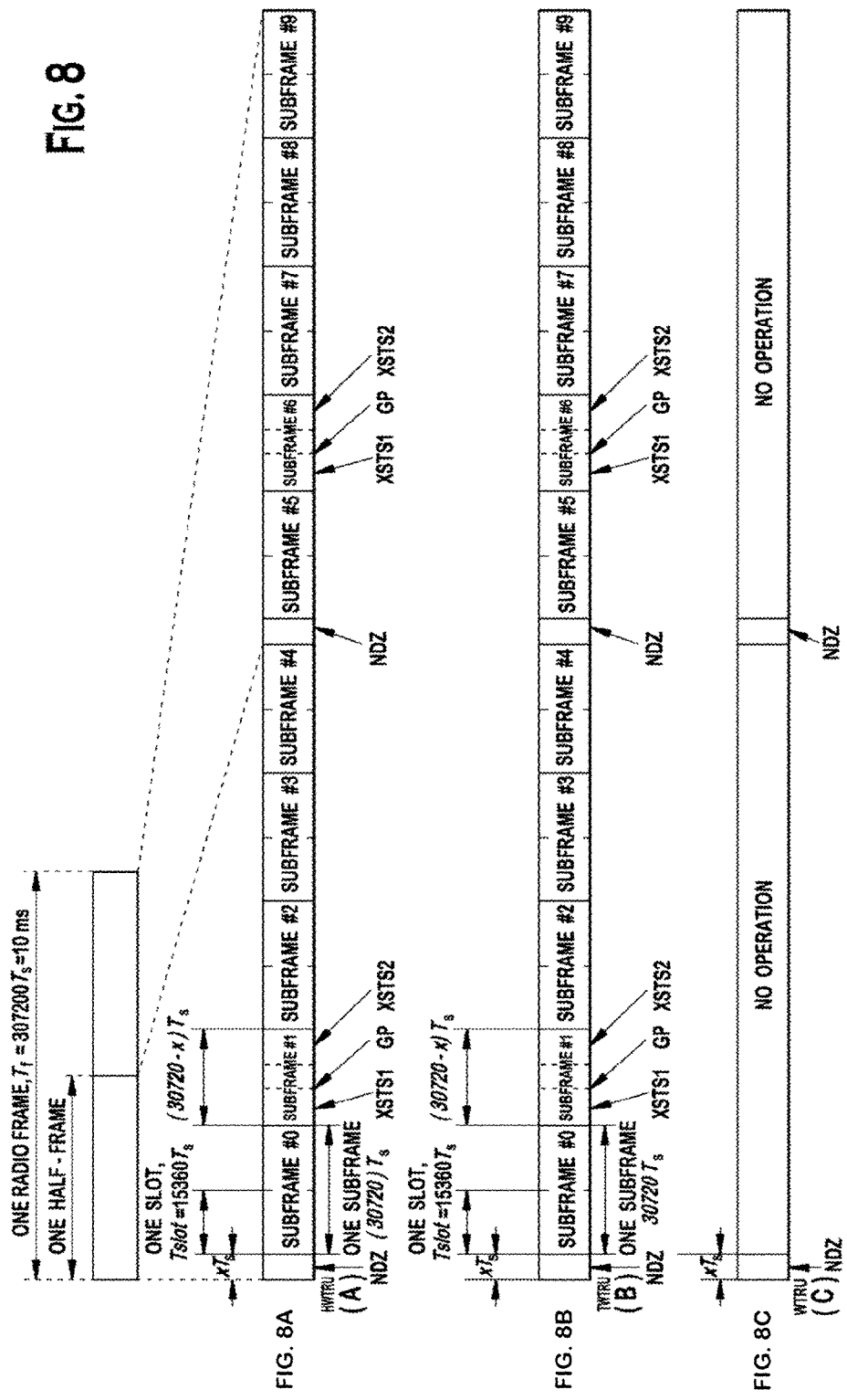

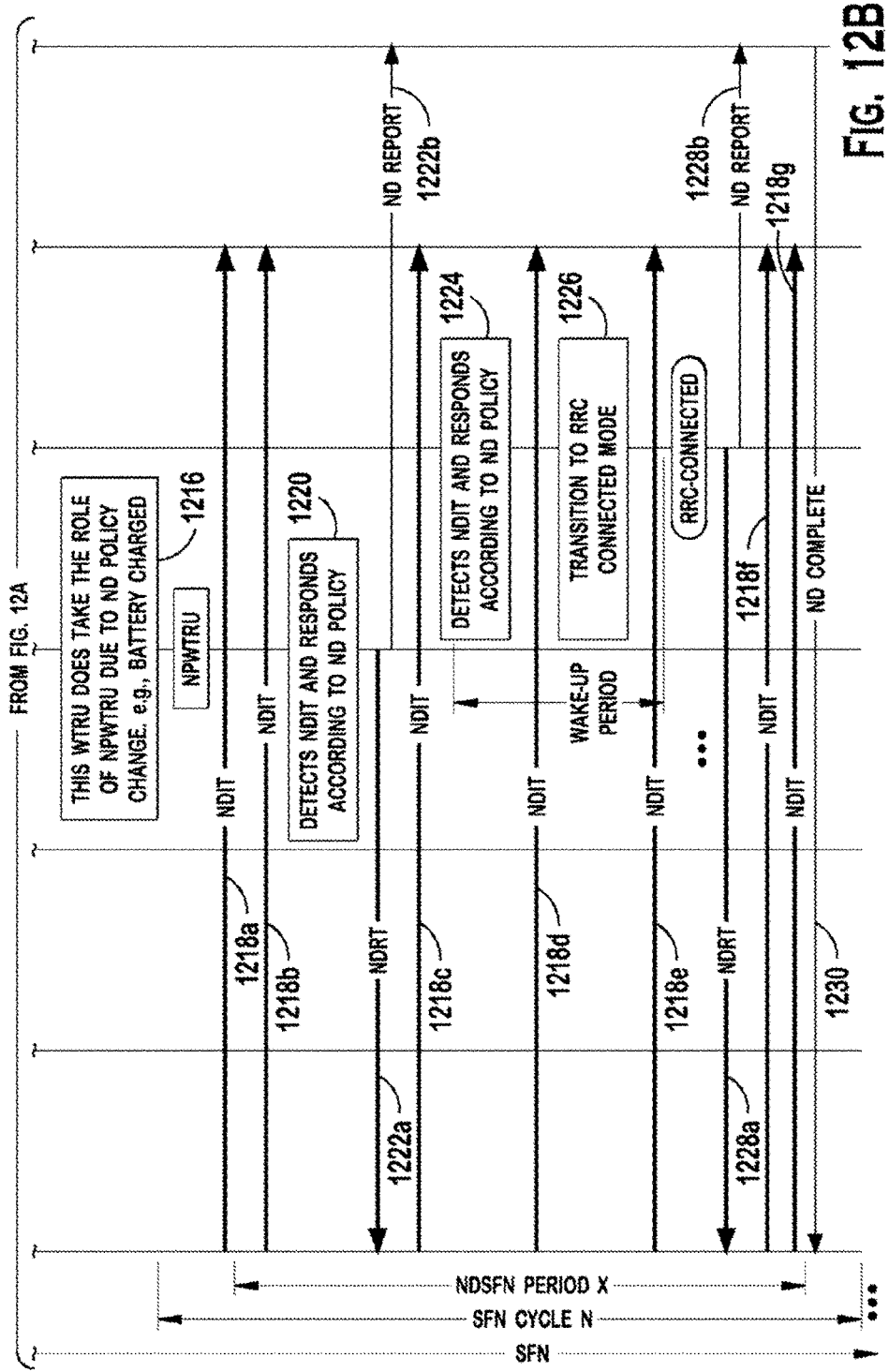

METHOD AND APPARATUS FOR PERFORMING NEIGHBOR DISCOVERY

CROSS REFERENCE TO RELATED APPLICATIONS

This application is a continuation of U.S. patent application Ser. No. 14/125,302 filed Jul. 24, 2014, which is a 371 National Phase of International Patent Application of PCT/US2012/041515 filed Jun. 8, 2012, which claims the benefit of U.S. provisional application Nos. 61/495,797 filed Jun. 10, 2011, 61/495,837 filed Jun. 10, 2011, and 61/565,149 filed Nov. 30, 2011, the contents of which are hereby incorporated by reference herein.

BACKGROUND

The demand for wireless mobile data is increasing. To meet this increasing demand, standards have been developed to increase the spectral efficiency, for example, through the use of better multiple access, modulation and coding, and multi-antenna techniques.

One method considered for capacity improvement is device-to-device direct communication. If wireless transmit/receive units (WTRUs) (e.g., a mobile device or a user equipment (UE)) communicate directly with each other, an alternate topology that co-exists with the conventional cellular deployment may be created. An example application enabled by such direct peer-to-peer communications includes WTRU relaying. In the WTRU relay application, a terminal WTRU (TWTRU) exchanges data with the network through a helper WTRU (HWTRU).

For mobile relay operations and peer-to-peer direct communications WTRUs may need to know their surrounding in terms of the physical presence and movement of their peer WTRUs. This awareness may enable a WTRU to recognize each of its neighbors with further information such as identity, mutual distance, etc.

In current cellular wireless communication systems, a WTRU communicates solely with the infrastructure node (e.g., a base station or a relay) that it is associated with and may not have any knowledge about the surrounding devices.

SUMMARY

A method and apparatus for neighbor discovery in a wireless communication system are disclosed. A neighbor seeking WTRU may send a neighbor discovery request to a network and receive neighbor discovery configuration information from the network in response to the neighbor discovery request. The neighbor discovery configuration information necessary for performing the neighbor discovery procedure is provided to WTRUs participating in the neighbor discovery. The neighbor seeking WTRU may send a first beacon. The neighbor WTRUs (i.e., the WTRUs present near the neighbor seeking WTRU that will be referred to as "neighbor present WTRU" (NPWTRU)) receive the first beacon and may send either a report to the network or send a second beacon to the neighbor seeking WTRU. The network may send a message including neighbor WTRU information to the neighbor seeking WTRU. The neighbor discovery may be performed within a pre-defined group of WTRUs that is formed based on proximity to the WTRU and/or an attribute of the WTRU.

A neighbor discovery may be performed without sending a request to the network. A WTRU may initiate a neighbor discovery procedure on a condition that a pre-defined trigger event occurs, or a neighbor discovery is scheduled by a neighbor update period or requested by a network. A WTRU may transmit a first beacon for neighbor discovery and monitors a pre-configured resource for a response from the neighbor WTRUs. Neighbor WTRUs receive the first beacon and may transmit a second beacon to the WTRU or a neighbor discovery report to the network.

The neighbor discovery procedure may be performed to find neighbor WTRUs in case where a WTRU fails to find any network upon power up or lost a connection to the network. A neighbor list may be generated by the neighbor seeking WTRU by measuring reference signals transmitted by neighbor WTRUs on an uplink to the network.

A method and apparatus for neighbor discovery in a wireless communication system are disclosed. A neighbor seeking wireless transmit/receive unit (WTRU) may search for a first signal to discover neighbor WTRUs for peer-to-peer communication. The WTRU may then receive the first signal. Further, the WTRU may generate a report based on the received first signal. Then, the WTRU may send a second signal carrying the report to a cellular wireless network.

In examples, the first signal may include a beacon for neighbor discovery or a synchronization signal or both. The report may contain at least one neighbor WTRU identity or at least a portion of a time value or both. Further, the report may contain a counter value, including at least a portion of a time value. The counter value may be based on a time source, in an example. In addition, the first signal may be received from a synchronization source. Also, the first signal may carry a fixed pattern sequence used by WTRUs in a cell.

BRIEF DESCRIPTION OF THE DRAWINGS

A more detailed understanding may be had from the following description, given by way of example in conjunction with the accompanying drawings wherein:

FIGS. 8(A) to 8(C) show an example of neighbor discovery zone (NDZ) configuration in an LTE time division duplex (TDD) frame;

FIGS. 12(A) and 12(B) are a signaling diagram of an example process for neighbor discovery without pre-grouping in accordance with one embodiment.

DETAILED DESCRIPTION

Figure 1A:
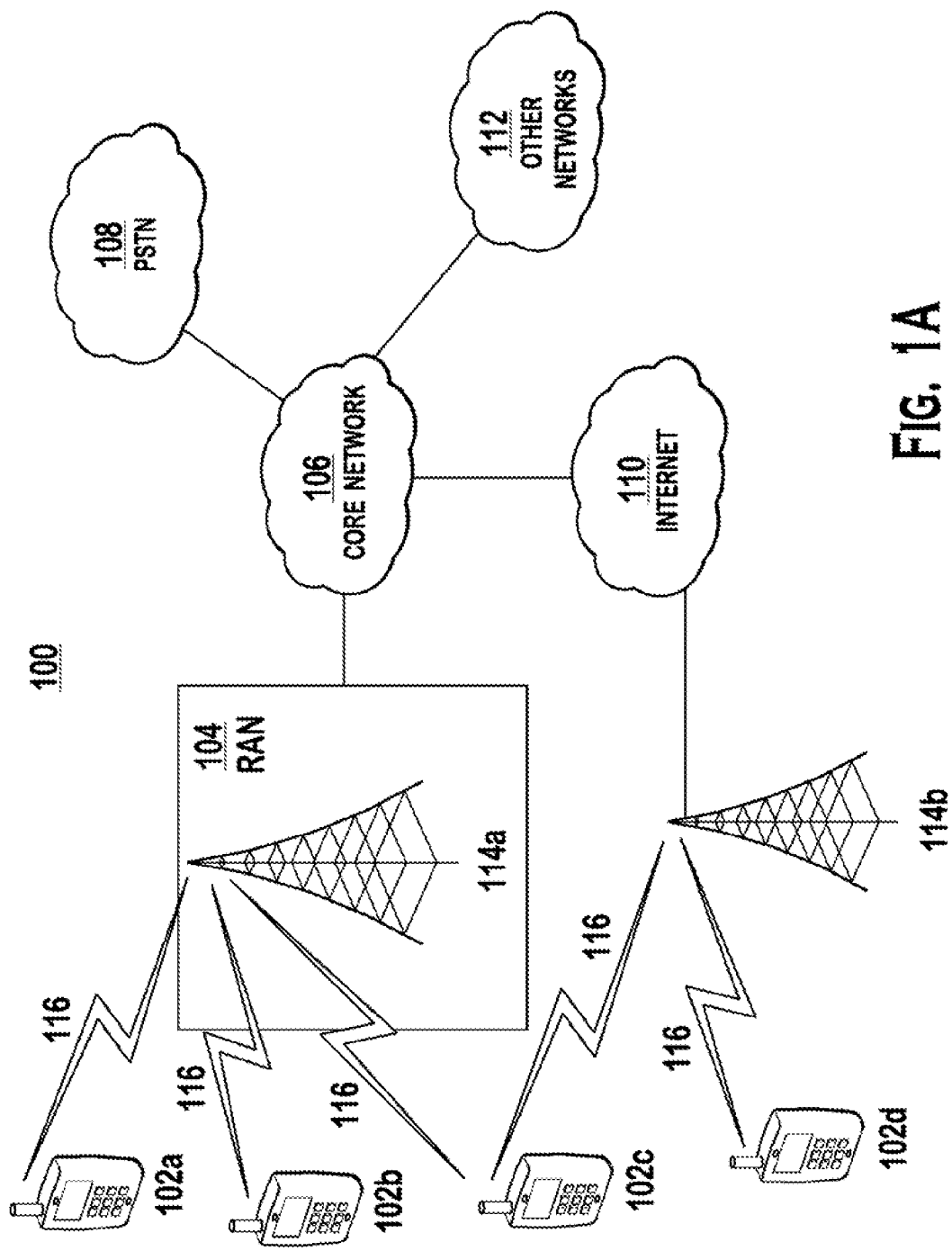
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
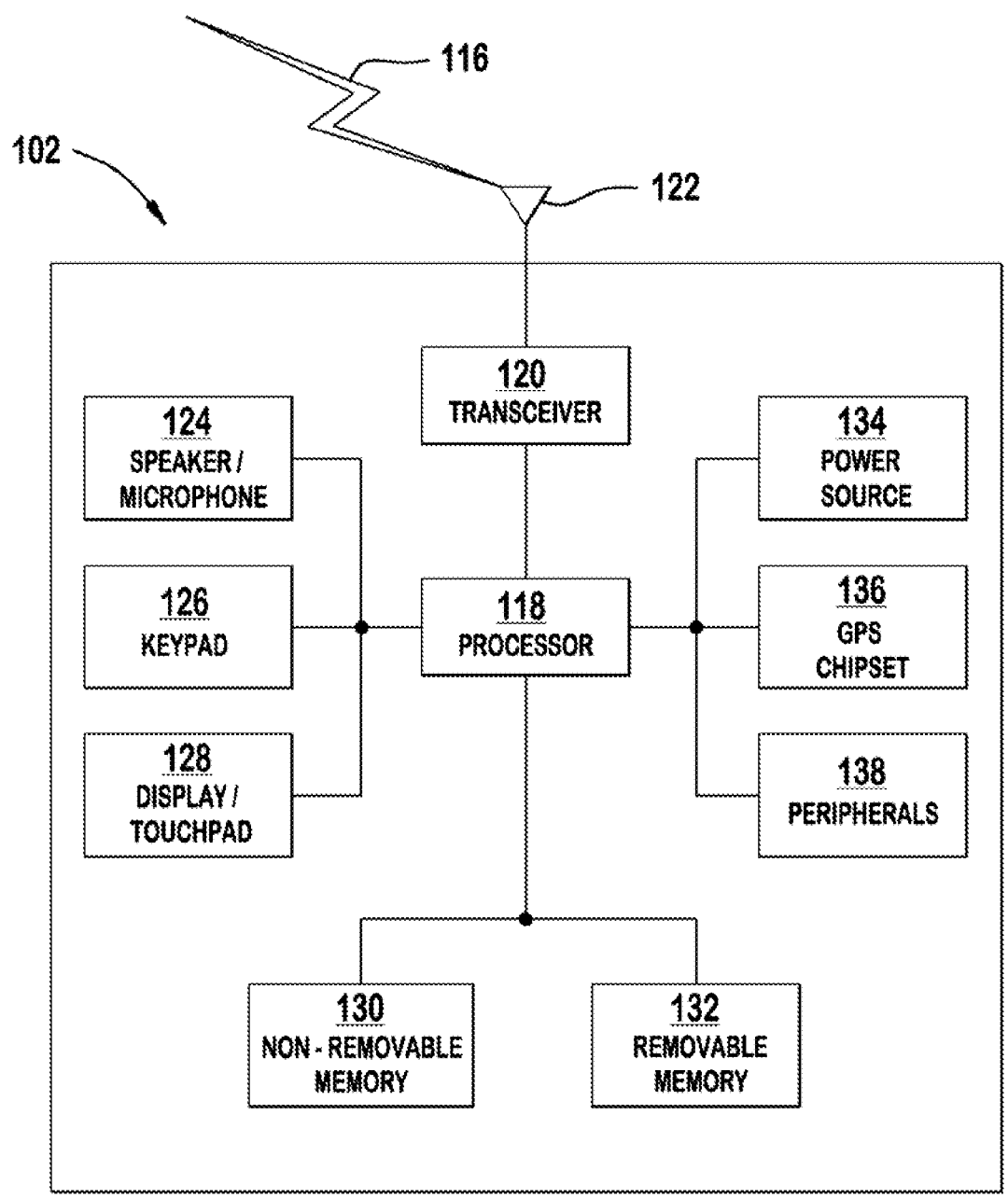
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
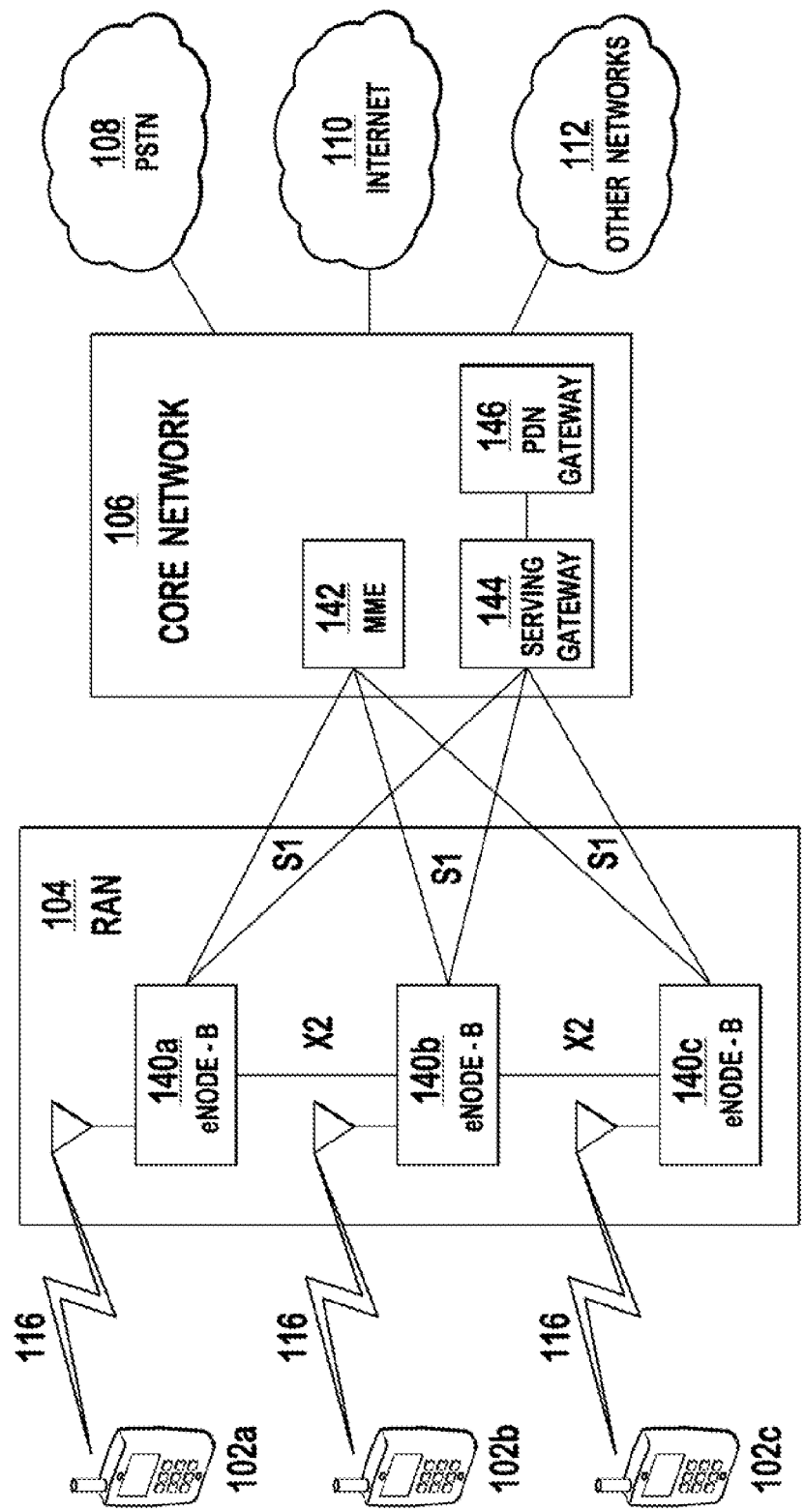
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The embodiments may be explained with reference to 3GPP LTE, but the embodiments are applicable to any wireless communication systems.

The term "neighbor seeking WTRU" (NSWTRU) may refer to a WTRU that performs the neighbor discovery to find any neighbor WTRU. The term "neighbor present WTRU" (NPWTRU) may refer to a WTRU that is present in the vicinity of the NSWTRU and responds to the neighbor discovery initiated by the NSWTRU.

In embodiments disclosed hereafter, WTRUs may perform neighbor discovery under the control of the network (e.g., an eNB). Neighbor discovery may comprise transmissions of specific types of beacons, preambles, reference signals, or the like (hereafter "beacon" collectively) that are dedicated to the neighbor discovery process. The transmissions may be either allocated in a fixed and pre-determined resource location or scheduled in a dynamic manner in time and frequency domains. The transmissions of the beacons may carry specific device identification information.

WTRUs in a cell may be grouped into one or more groups (i.e., pre-grouping prior to neighbor discovery) and a neighbor discovery process may be performed in a group of WTRUs.

In addition, a specific group identity may be applied to enable a common configuration of the WTRUs in a group. The transmission power may be dimensioned for a group of WTRUs within a pre-determined proximity and the neighbor discovery processes of multiple groups may be coordinated by a central node to control the interference.

Neighbor discovery may be scheduled in a staggered manner between different groups in one cell. For example, when a neighbor discovery is scheduled in a certain radio frame in one group, other groups in the same cell may have regular data transmission in the same radio frame. It may also provide the controlling eNB and/or MME a certain degree of scalability of the neighbor discovery process. For example, the size of the group in terms of the number of WTRUs may be scaled depending on the WTRU density or traffic load of the cell.

Device-to-device communications may be implemented for capacity enhancement or coverage improvement. In the capacity enhancement mode, a terminal WTRU (TWTRU) is associated with the network and enlists a helper WTRU (HWTRU) to augment the radio link capacity and improve data transmission capacity. In the coverage improvement mode, a TWTRU is out of network coverage and relies on an HWTRU to attain the network association.

In the capacity enhancement mode, the pre-grouping information may be conveyed by the network in the neighbor discovery configuration (i.e., provided prior to the neighbor discovery), or embedded in the neighbor discovery procedure. In the coverage extension mode, completing pre-grouping prior to the neighbor discovery may not be plausible, since an NSWTRU, (i.e., a TWTRU), is not associated with the network and thus cannot receive any information regarding the pre-grouping. Neighbor discovery may still be restricted to a group of WTRUs by identifying the embedded pre-grouping information in the neighbor discovery process, for example, at the beginning of the process.

In one embodiment, pre-grouping of WTRUs may be performed based on the proximity of WTRUs, (i.e., forming a proximity group). Each cell may be divided geographically into multiple proximity groups based on pre-determined geography information of the cell. Based on positioning information obtained for WTRUs, the network may assign the WTRUs to the corresponding proximity group. WTRUs belonging to one proximity group are geographically located within a pre-defined proximity area determined by the positioning information. The positioning information may be obtained through Global Positioning System (GPS) or other available location services in the system. The network may assign a hysteresis value to avoid the ping-pong effect in which a WTRU moves back and forth between proximity groups.

WTRUs in the same proximity group may not necessarily constitute a pair of good neighbors in terms of the propagation conditions between them. For example, if two WTRUs are on two different floors of one building covered by one cell, the positioning service result may have them in the same proximity group but the path loss between the WTRUs may be prohibitive for a WTRU-to-WTRU direct communication.

Alternatively, two WTRUs in different proximity groups may have good propagation conditions between them. This issue may be addressed by having WTRUs monitor (e.g., with a reduced priority) the neighbor discovery transmissions from WTRUs outside of their proximity group and report these periodically to the network, which may perform group reassignment.

A WTRU that is registered with the network may be assigned to one proximity group and the grouping information may be maintained in the network. The positioning information may be obtained using WTRU-based or network-based positioning methods (e.g., any methods that are currently available in the network). If the network may not receive positioning information from a specific WTRU for a pre-determined period of time (due to mobility, powered off state, or other reasons), the network may remove that WTRU from its corresponding proximity group.

In an LTE network, once a WTRU is registered in the network, it may be either in an LTE-CONNECTED state (e.g., RRC_CONNECTED state) or an LTE-IDLE state (e.g., RRC_IDLE state) based on user activity level. To avoid maintenance of stale positioning information in the network, the WTRU positioning information may be updated periodically. The periodicity may vary depending on the WTRU state. For example, when a WTRU is inactive during the discontinuous reception (DRX) cycle, the periodicity for positioning information update may be configured to be multiple of the DRX cycle length.

In another embodiment, a proximity group may be defined for an individual WTRU when it initiates the neighbor discovery process. The eNB determines which WTRUs are the members of a proximity group based on the positioning information and/or other pre-determined criteria. WTRUs in the proximity group may participate in the neighbor discovery process initiated by the WTRU that belongs to the proximity group.

The NSWTRU may have its own proximity group (i.e., the WTRU is a head (or master) of the proximity group and may exercise some control over the group) and may belong to other proximity groups (i.e., the WTRU is a member of other proximity group(s)).

Figure 2:
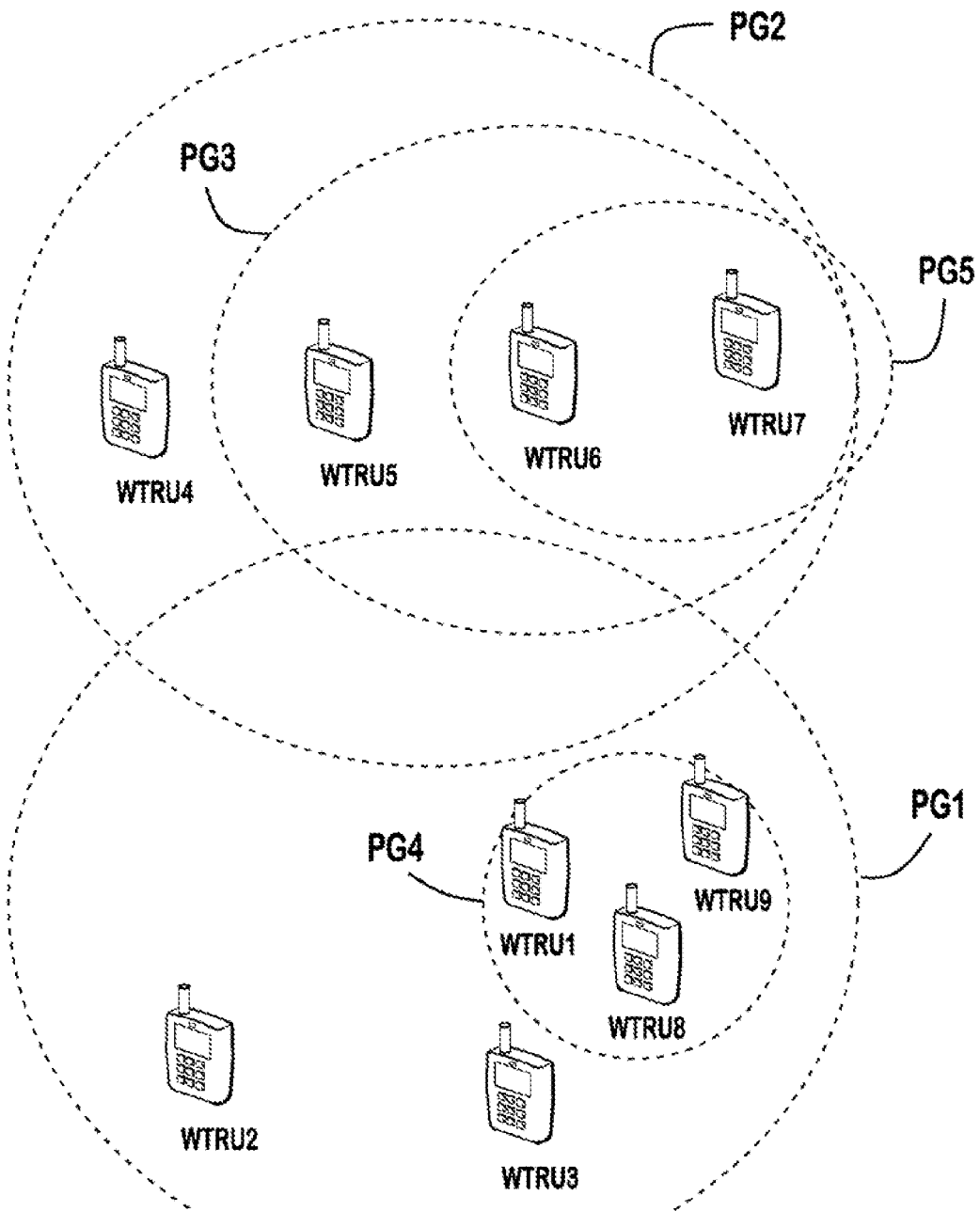
FIG. 2 shows relationship between different levels of grouping of WTRUs.

FIG. 2 shows relationship between different levels of grouping of WTRUs. In this example, PG1 is the proximity group of WTRU1, WTRU2, WTRU3, WTRU8, and WTRU9, PG2 is the proximity group of WTRU4, WTRU5, WTRU6, and WTRU7, PG3 is the proximity group of WTRU5, WTRU6, and WTRU7, PG4 is the proximity group of WTRU1, WTRU8, and WTRU9, and PG5 is the proximity group of WTRU6 and WTRU7. Table 1 shows the own proximity group and membership status of other proximity groups of WTRUs.

TABLE 1

| WTRU | Own proximity group | Proximity group membership |
| --- | --- | --- |
| WTRU1 | PG1 | PG4 |
| WTRU5 | PG2 | PG3 |
| WTRU6 | PG3 | PG2, PG5 |
| WTRU8 | PG4 | PG1 |
| WTRU7 | PG5 | PG2, PG3 |

As shown in Table 1, there may be overlap between different proximity groups and the network may coordinate neighbor discovery processes in different proximity groups to limit interference. The coverage area of each proximity group may or may not overlap, as the network may coordinate the transmission power, schedule instances or resource locations of each neighbor discovery so that simultaneously transmitting proximity groups may be separated.

A cell may be configured as a proximity group, (e.g., in case of femto or pico cells), and the cell or sector identity may be reused to identify the proximity group. This approach may reduce network handling of the proximity group formation, update, and maintenance. This may be applicable to WTRUs in the RRC connected state because WTRUs in RRC idle state are registered to the network at the tracking area level in the MME. To assign WTRUs to a proximity group based on its cell association information, WTRUs may be registered at the cell level known to the eNB, which occurs in RRC connected state.

The capacity enhancement mode may be implemented with proximity group configuration because the network may be updated with the WTRU location information for the proximity group assignment and network attachment is the prerequisite. The pre-grouping may be facilitated by sending RRC signaling of the neighbor discovery process to the proximity members.

Figure 3:
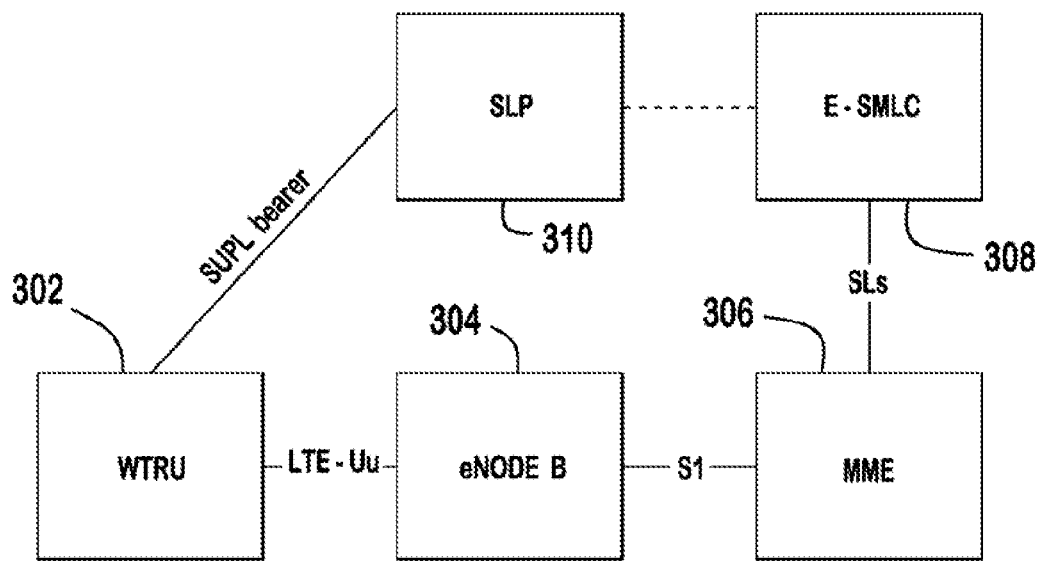
FIG. 3 shows the WTRU positioning system in the evolved packet system (EPS)

FIG. 3 shows the WTRU positioning system in the evolved packet system (EPS). The MME 306 may initiate the location service upon receiving a request for location service associated with a target WTRU 302 from another entity, such as a gateway mobile location center (GMLC) (not shown), an eNB, or a WTRU. The MME 306 may initiate location services on behalf of the target WTRU 302 (e.g., for an IMS emergency call from the WTRU). The MME 306 sends a location service request to the evolved serving mobile location center (E-SMLC) 308, and the E-SMLC 308 processes the location service request. The process may include transferring assistance data to the target WTRU 302 to assist with WTRU-based and/or WTRU-assisted positioning and/or may include positioning of the target WTRU 302. Once complete, the E-SMLC 308 returns the result back to the MME 306 (e.g., a position estimate for the WTRU 302 and/or an indication of any assistance data transferred to the WTRU 302). The MME 306 may further forward the result to another entity if the location service is requested by another entity.

The procedure above describes the flow for positioning over the control plane. The secure user plane location (SUPL) platform (SLP) 310 is responsible for positioning over the data plane. The SLP 310 communicates with the WTRU 302, referred to as the SUPL enabled terminal (SET), over the data plane and communicates with the E-SMLC 308 via a proprietary interface. The SLP 310 may be included, whole or in part, in the E-SMLC 308.

The E-SMLC 308 manages the support of location services for target WTRUs 302, including positioning of WTRUs and delivery of assistance data to the WTRUs. The E-SMLC 308 may interact with the serving eNB 304 to obtain position measurements for the target WTRU 302 including uplink measurements made by the eNB 304 and downlink measurements made by the WTRU 302 that are provided to the eNB 304 as part of other functions such as support of handover.

Figure 4:
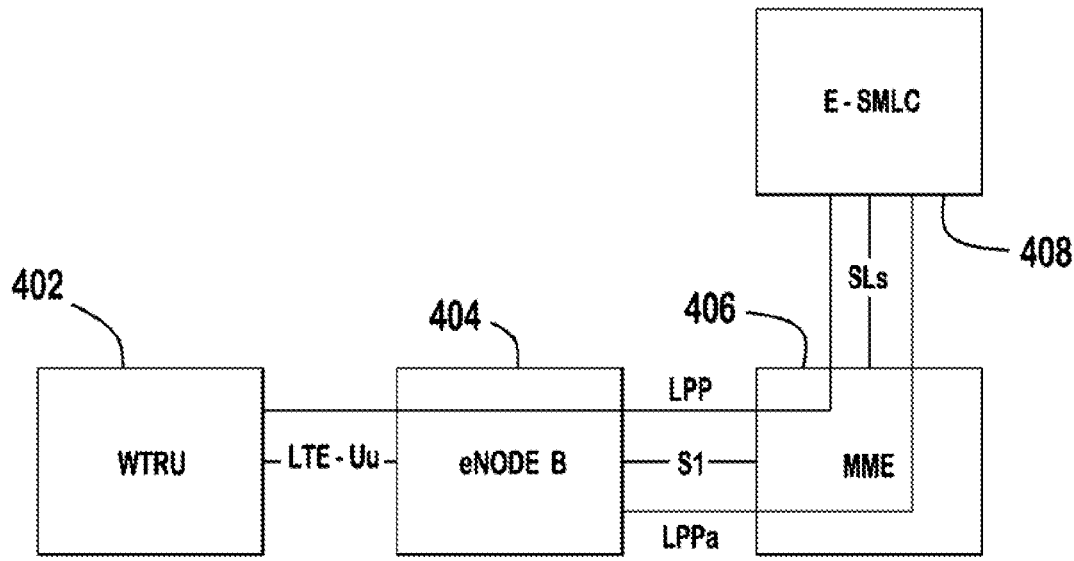
FIG. 4 shows Long Term Evolution (LTE) positioning protocols architecture.

FIG. 4 shows LTE positioning protocols architecture. LTE positioning protocol (LPP) and LTE positioning protocol a (LPPa) were added for support of positioning. The LPP is a point-to-point protocol between the E-SMLC 408 and the WTRU 402. It passes through the MME 406 and the eNB 404 without any operations in those entities. The eNB 404 may not look inside the LPP to obtain any information, and the information the eNB 404 needs may be sent directly by the E-SMLC 408 via LPPa messages. The MME 406 may look inside the LPP and/or LPPa messages. The LPPa may be used for transfer of positioning related information (e.g., PRS scheduling information) from the eNB 404 to the E-SMLC 408.

Figure 5:
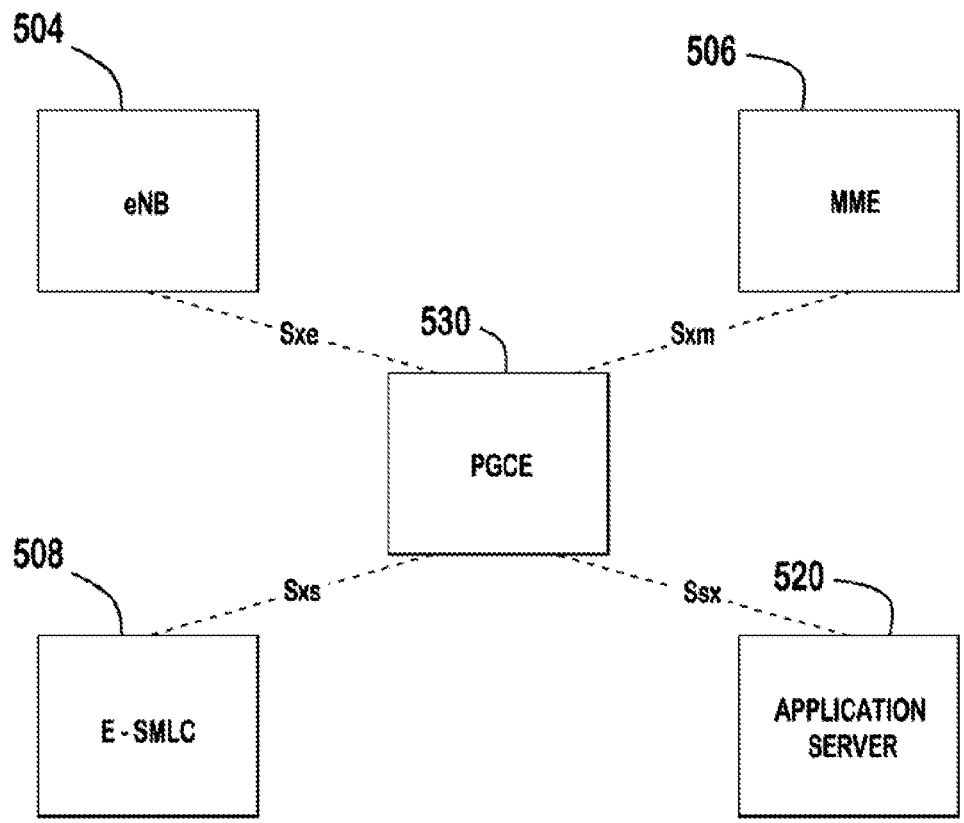
FIG. 5 shows example interfaces between the proximity group coordinating entity (PGCE) and other entities.

FIG. 5 shows example interfaces between a proximity group coordinating entity (PGCE) 530 and other entities. The PGCE 530 may allow for the consolidation and synthesis of the positioning information obtained from the EPS. The PGCE 530 is a logical entity and may be running in a separate location or may be co-located with the E-SMLC 508, the MME 506, the eNB 504, or other EPC/application server 520.

The PGCE 530 administers proximity group information and may have logical interfaces defined towards the E-SMLC 508, the MME(s) 506, the eNB(s) 504, or other EPC/application servers 520. $S_{xs}$ is a PGCE interface towards the E-SMLC 508, which is a logical interface for requesting and reporting positioning information along with required positioning and reporting configuration information. $S_{xm}$ is a PGCE interface towards the MME 506, which is a logical interface to provide WTRU specific information such as WTRU state, WTRU-ID(s), WTRU related parameters such as advanced topology (AT) capabilities of the WTRU (i.e., the capability of operating in heterogeneous networks comprising a mix of macrocells with low power nodes such as picocells, femtocells, and relay nodes, etc.), DRX, tracking area identity (TAI), etc., and request for WTRU's proximity group and response including potential neighbor WTRU list, common/group DRX, a group identity (such as international mobile subscriber identity (IMSI)) for neighbor discovery (GROUP-ND-IMSI), a neighbor discovery radio network temporary identity (ND-RNTI) for the proximity group, etc. $S_{xe}$ is a PGCE interface towards the eNB 504, which is a logical interface to provide WTRU specific information such as WTRU state, WTRU-ID(s), WTRU related parameters such as AT capabilities of the WTRU, DRX, neighbor discovery report updates, and request for WTRU's proximity group and response including potential neighbor WTRU list, common/group DRX, GROUP-ND-IMSI, ND-RNTI for this proximity group, etc. $S_{xx}$ is a PGCE interface towards the application server 520, which is a logical interface for requesting/reporting target group based pre-grouping information.

Figure 6:
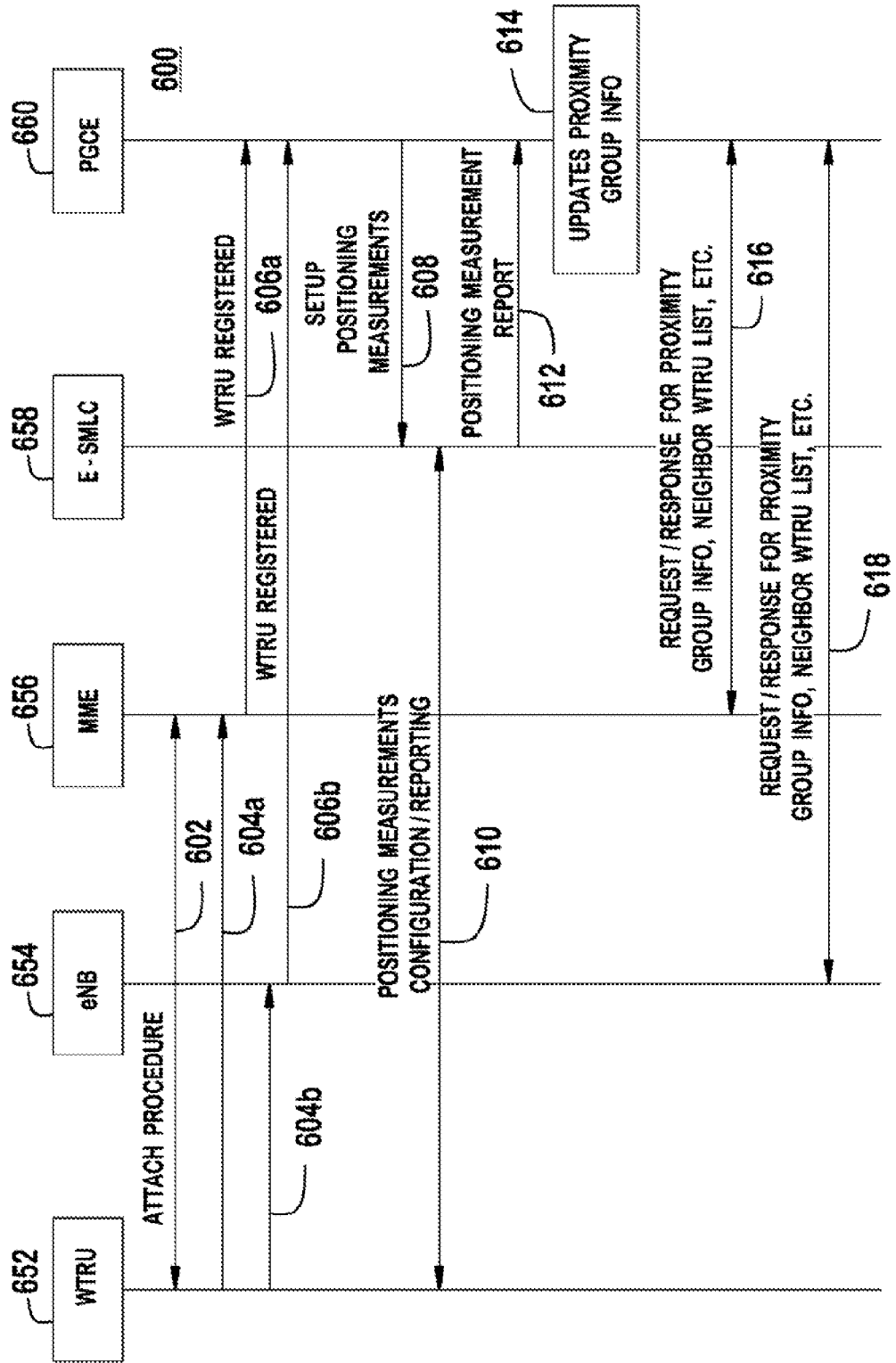
FIG. 6 shows an example signaling procedure for proximity pre-grouping with a PGCE.

FIG. 6 shows an example signaling procedure for proximity pre-grouping with a PGCE 660. The pre-grouping process may be coordinated by the eNB 654, the MME 656, and the E-SMLC 658. WTRUs 652 perform an attach procedure with the MME 656 (602). The WTRU AT capability information may be provided to the PGCE 660 during or after the attach procedure (i.e., registration with the network). In one embodiment, as part of registration, whether a WTRU 652 is AT capable or not may be indicated in NAS capabilities information (604a), and the MME 656 may report the AT capable WTRUs to the PGCE 660 (606a). Alternatively, during or after the RRC connection establishment, the WTRU AT capability information may be exchanged with the eNB 654 using a WTRU capability message (604b), and the eNB 654 may report it to the PGCE 660 (606b).

The PGCE 660 sets up positioning measurements with the E-SMLC 658 (608). The PGCE 660 may request periodic positioning updates. The E-SMLC 658 obtains position measurements for the WTRU 652 (e.g., using LPP, LPPa, SUPL) (610), and sends a positioning measurements report to the PGCE 660 (612). When the LPP is used, the E-SMLC 658 is assisted by the eNB 654 and/or the MME 656 per LPP/LPPa protocols. When the SUPL is used, the process may be transparent to the eNB 654 and the MME 656.

With the positioning information available, the PGCE 660 may determine or update the corresponding proximity group and assign the WTRU 652 to a specific proximity group (614). The PGCE 660 may provide a list of neighbor WTRUs to the MME 656 and/or the eNB 654 as the members of a given WTRU's proximity group (616, 618).

When an AT-capable WTRU enters DRX cycles, the measurements for the location service may not be available. Therefore, an extra reporting cycle may be imposed on top of the DRX cycle for the purpose of the location measurement reporting.

Figure 7:
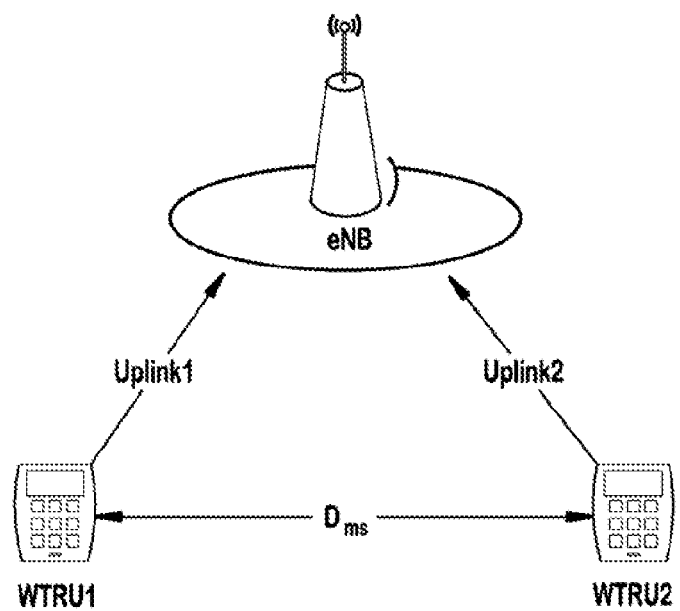
FIG. 7 shows uplinks exhibiting cross-correlation in propagation parameters between neighboring WTRUs.

In another embodiment, formation and maintenance of a proximity group may be based on the observed correlation between the measurements of the uplink propagation parameters of WTRUs. For example, the correlations of delay spread (DS), azimuth spread (AS), and shadow fading (SF) between radio links from different WTRUs to the same eNB are in a cross-correlation that may be approximated as an exponential function with dependence on the distance between WTRUs. FIG. 7 shows uplinks exhibiting cross-correlation in propagation parameters between neighboring WTRUs. As illustrated in FIG. 7, two WTRU uplinks toward the same eNB experience correlations in those parameters that decay at an exponential rate as the inter-WTRU distance (Dms) increases. The network (e.g., the eNB) measures the propagation parameters such as AS, DS and SF, calculates the cross-correlation of the propagation parameters of each pair of WTRUs in one cell, and assigns the WTRUs with highly correlated uplink propagation parameters to one proximity group.

The evaluation of the uplink signals may be performed, based on the LTE uplink sounding reference signal (SRS). The LTE network performs channel estimation using the SRS transmitted by each WTRU to aid frequency-selective uplink scheduling for the WTRU. In the time domain, the SRS is located in the last single carrier frequency division multiple access (SC-FDMA) symbol of the configured subframe. The sub-frame, bandwidth, comb, and other configurations for SRS may be indicated by cell-specific broadcast signaling and/or WTRU-specific dedicated signaling. The SRS transmissions may be periodic according to the semi-static configuration or aperiodic, i.e., triggered by either higher layer signaling (trigger type 0) or DCI format (trigger type 1).

A WTRU may not transmit in the uplink during DRX, and an update of cross-correlation of the propagation parameters of the WTRUs may not be performed for the WTRUs in DRX. Therefore, the network may schedule SRS transmissions in coordination with the DRX cycles.

In another embodiment, a target group may be formed as a form of pre-grouping that may be used to selectively discover neighbors. In this embodiment, proximity may not qualify for becoming a member of the target group. The target group pre-grouping utilizes further criteria other than the proximity in forming a group of WTRUs. The target group may bring selectiveness to the neighbor discovery process by seeking neighbors that share certain common interests in addition to the geographical area. The common interests may be due to some trait common to a group of WTRUs, for example, membership to the same social club, same model mobile device, or same capability of security protection in the WTRU application software, etc. Neighbors fulfilling the criteria may participate in the neighbor discovery process and proceed with subsequent operations, such as WTRU as a relay or WTRU-to-WTRU peer communications.

To form a target group, the network may access WTRU information, for example, that is available when the WTRU is attached to the network. When the WTRU is registered with the network, attributes of the WTRU may be reported to the network in a similar manner as WTRU capability reporting. For example, the reported attributes may indicate certain membership or characteristics to identify a group of WTRUs and assign them to a target group. The target group is suited for peer-to-peer communication when the neighbor discovery is a precursor to a mutual communication intended between the group members.

In the capacity enhancement mode in which WTRUs are associated with the network, the target group configuration specific to the neighbor discovery process may be conveyed by RRC signaling sending the neighbor discovery configuration to the WTRUs that belong to the target group.

Alternatively, the target group configuration specific to the neighbor discovery process may be conveyed by selection of neighbor discovery transmission beacon and/or its resource allocation. The transmission sequence may carry a unique signature corresponding to a target group identity according to a pre-defined mapping known to both the eNB and WTRUs. The resource location of the sequence transmission may be used to indicate the target group identity. This alternative may be applied for coverage extension mode as well when the neighbor seeking WTRU is not associated with the network.

Embodiments for neighbor discovery procedures are disclosed hereafter. Neighbor discovery may be performed using a transmission-based scheme or a listening-based scheme. The neighbor discovery process may be performed on a per group basis (e.g., proximity group or target group). Alternatively, the neighbor discovery process may be performed without pre-grouping.

Embodiments for transmission-based neighbor discovery are disclosed hereafter. In the transmission-based neighbor discovery scheme, WTRUs transmit a beacon (e.g., a reference signal, a preamble), that may be referred to as neighbor discovery initiation transmission (NDIT) and neighbor discovery response transmission (NDRT) hereafter. The beacon may be based on a synchronization sequence that includes a fixed number of pseudorandom complex numbers and possesses a constant amplitude property. The sequence pattern may enable detection of the beacon based on the correlation between the received sequence and the pre-defined sequence. The constant amplitude property may enhance the efficiency of the mobile device transmitter.

The beacon transmissions (e.g., NDIT and NDRT) may occur in a pre-defined resources region, called the neighbor discovery zone (NDZ), which comprises a pre-defined set of resources in time and frequency domains assigned for the beacon transmissions.

The NDZ configuration may be pre-defined and stored in the WTRU in order for a WTRU to initiate neighbor discovery process without any instruction from the network. In a "cold-start" case where a WTRU fails to associate with any network at power-up, the WTRU may resort to the default neighbor discovery configuration to execute the neighbor discovery process to acquire neighbor associations. WTRUs may possess sufficient knowledge of the neighbor discovery configuration and may perform the neighbor discovery procedure without any network association. Alternatively, the network may configure information for the neighbor discovery for the WTRUs associated with the network.

FIGS. 8(A) to 8(C) show an example of NDZ configuration in an LTE TDD frame. In this example, an NDZ is configured at the start of the first half-frame and the second half-frame, respectively. In this example, an independent NDZ is configured, wherein WTRUs transmit or receive according to the neighbor discovery scheduling.

When a WTRU is participating in relaying data and/or control signaling for another WTRU (as shown in FIGS. 8(A) and 8(B)), the NDZ may be multiplexed in the time domain with resources applied for control and/or data channels on the cross link between WTRUs. The NDZ may be accessed according to the neighbor discovery schedule, (e.g., a neighbor seeking WTRU (NSWTRU) transmits an NDIT in the first NDZ of the frame and a neighbor present WTRU (NPWTRU) transmits an NDRT in the second NDZ of the frame).

The WTRUs may execute the neighbor discovery function on the cross link (the radio link between WTRUs for peer-to-peer communication) while not participating in the relay application, i.e., being neither a helper WTRU (HWTRU) nor a terminal WTRU (TWTRU). In this case, as shown in FIG. 8(C), the NDZ may not be multiplexed in the time domain with any actively used resources.

In the example shown in FIGS. 8(A) and 8(B), the cross link downlink (XDL) occupies sub-frames 2, 3, 4, and 5 and the cross link uplink (XUL) occupies sub-frames 7, 8, 9, and 0. Sub-frames 1 and 6 are special sub-frames where XDL-XUL switching occurs and each special sub-frame includes the crosslink special time slot 1 (XSTS1), the crosslink special time slot 2 (XSTS2) and the guard period (GP). The GP is to account for switching delay between transmit and receive including power ramp up and ramp down.

The LTE TDD GP length is configurable depending on the cell radius to account for both the maximum timing advance and hardware switching delay. On the cross link this consideration is not applicable, because timing advance is applied to align multiple uplink transmissions in time so that they arrive at the eNB within a difference no larger than cyclic prefix. The cross link is a short-range and dedicated link and thus no timing advance may be used.

In FIGS. 8(A) and 8(B), the sum of the duration of NDZ, GP, XSTS1 and XSTS2 in time domain may be specified as one sub-frame. The example in FIGS. 8(A) and 8(B) is given with two UL/DL switching points that are the same as the number of NDZs per frame. However, the TDD DL-UL configuration may include more switching points and the NDZ may be integrated accordingly.

Figure 9:
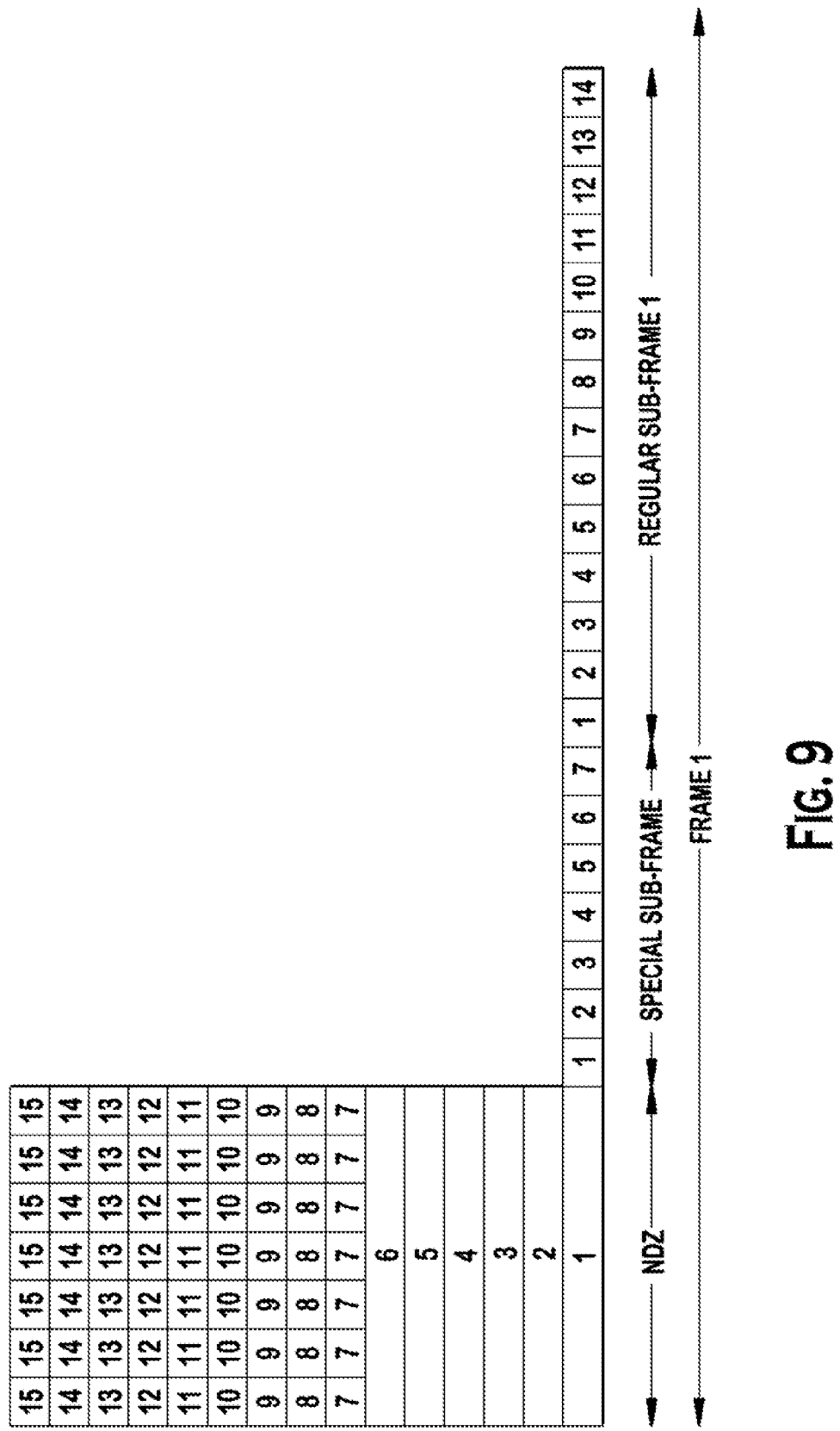
FIG. 9 shows an example of NDZ multiplexing with cross link channels.

In the frequency domain, the NDZ may occupy a number of sub-carriers that may span a few resource blocks (RBs). FIG. 9 shows an example of NDZ multiplexing with cross link channels. In this example, the total cross link system bandwidth of fifteen (15) RBs and NDZ duration of one time slot (7 SC-FDMA symbols in this example) is assumed. The NDZ takes six (6) out of fifteen (15) RBs in this example and the rest of the RBs may be used for signaling exchange for certain control functionalities that a WTRU may perform without association with the network.

The entire cross link bandwidth (fifteen RBs in this example) may be used for the beacon transmission, (i.e., NDZ spans over the entire bandwidth). The detection performance may improve with higher bandwidth due to the diversity gain against frequency selective fading.

The beacon signals (e.g., NDIT and DNRT) may re-use the SC-FDMA signals in the LTE uplink, for example, the random access channel (RACH) preamble. The Zadoff-Chu (ZC) sequence used for RACH preamble may be used for the beacon signal. The NDIT based on ZC sequence may carry a signature that uniquely identifies its sender. The NDIT based on ZC sequence may also convey information regarding the types of neighbor discovery process such as whether the neighbor discovery is an initial neighbor discovery initiated by a WTRU associated with the network, whether the neighbor discovery is an update neighbor discovery initiated by a WTRU associated with the network, whether the neighbor discovery is initiated by a WTRU not associated with the network to gain network access, whether the neighbor discovery is initiated by a WTRU not associated with the network to place an emergency call, or the like. The NDIT based on ZC sequence may provide initial acquisition of timing and frequency synchronization for a WTRU in the "cold-start" case.

A unique WTRU signature carried by the NDIT may reduce collisions between WTRUs sending the NDITs at the same time and the ability to identify the type of the NDIT may help WTRU behavior upon detection of the beacon. The orthogonality of ZC-based NDIT may help distinguish not only the identity of the NSWTRU but also the purpose of the NDIT. The orthogonality may be obtained in the frequency domain, code domain, spatial domain, and the like.

The network may place different types of NDITs in different groups of sub-carriers. The network may apply different root sequences to different types of NDITs using the same group of sub-carriers. The network may apply different root sequences to different WTRUs using the same group of sub-carriers. The network may apply different cyclic shifts of the same root sequence to different WTRUs using the same group of sub-carriers. With pre-grouping, the network may apply sequence planning to make sure a set of root sequences used by a proximity group may be re-used by another adequately separated proximity group within the same cell.

The number of cyclic shifts that may be generated from one ZC root sequence depends on the cyclic shift size. The cyclic shift size may be dimensioned so that the zero correlation zone (ZCZ) of the sequences guarantees the orthogonality regardless of the delay spread and reduces time uncertainty. The cyclic shift size may be configured independently for each cell based on maximum delay spread, inter-cell interference, user density, etc. given the cell size.

The minimum value of the cyclic shift size may be the smallest integer number of sequence sample periods that is greater than the sum of the maximum delay spread, the time uncertainty between the NSWTRU and the NPWTRU, and additional guard samples, if necessary. Accordingly, for a cell with radius of up to 1 km the LTE physical random access channel (PRACH) applies an 839-symbol ZC sequence configured with a cyclic shift of 13 samples which translates to 64 cyclic shifts generated from one root sequence assuming a maximum delay spread of 5 us. For the cross link assuming the maximum delay spread of 5.2 us, the cyclic shift size may be set, for example, 6 or 7.

The ZC sequence length for NDIT and NDRT may be as long as possible to maximize the number of cyclic shifts, but it may be balanced against the impact to the system in terms of overhead, battery consumption, etc. When a WTRU monitors the NDZ of each frame, no control or data related operations are done and thus the larger the NDZ the more overhead imposed on the system.

Multiple root sequences may be used each with an equal number of cyclic shifts similar to that adopted for LTE PRACH. For example, the NDIT duration may be set to 400 us, i.e., period over 6 symbols and the resulting sub-carrier spacing is $1/400 \times 10^{-6} = 2.5$ kHz. A 6-RB allocation for NDIT results in 432 sub-carriers that may accommodate as many sequence symbols (the sequence length may be reduced to the maximum prime number smaller than 432). Assuming a cyclic shift size $N_{cs}$ of 10, one root sequence may generate 40 signatures and the total number of signatures is 40×the number of root sequences. Some root sequences may not only be used to generate WTRU signatures, but also to indicate the type of ND process. For example, when an NDIT is intended for an emergency call, the root sequence may be restricted to a pre-defined root sequence set.

With pre-grouping, the neighbor discovery may apply cell-wide sequence planning in terms of root sequences and cyclic shifts to implement root sequence re-use among spatially well-separated proximity groups.

The ZC sequence transmission allows for simultaneous detection, in the frequency domain, of multiple transmissions, e.g., multiple NDITs using different cyclic shifted sequences generated from the same root ZC sequence. The NPWTRU may detect simultaneous NDITs observing multiple peaks at the output of an inverse fast Fourier transform (IFFT) in different intervals using one root sequence in the correlation. A peak of the IFFT output in interval i corresponds to the i'th cyclically shifted sequence and its delay is given by the position of the peak in the interval.

The WTRU-to-WTRU synchronization may be assumed, which enables the orthogonality of the sequences. Alternatively, the NDIT may include a fixed sequence in order for WTRUs in the "cold-start" case to acquire initial timing and frequency references. The placement of the fixed sequence may precede the ZC sequence intended for the neighbor discovery. For example, if the NDIT sequence spans over 400 μs, the fixed sequence may take one (1) symbol time plus regular CP so that the total duration of the fixed sequence and WTRU specific sequence may be one time slot.

The NPWTRU may send a report to the eNB indicating detection of the NDIT along with some measure of the quality of the NDIT. The NPWTRU may locally broadcast an NDRT as a response transmission to the NDIT, which may be applied in the coverage extension mode as the responding NPWTRU may not be associated with the network. The NDRT may be based on ZC sequences, similar to the NDIT.

The NDRT may carry a WTRU signature to help identify the NPWTRU or carry a fixed pattern to reduce signaling overhead. The NDRT may convey information, for example, indicating that the response is from a WTRU associated with the network, the response is from a WTRU not associated with the network to gain network access, the response is from a WTRU not associated with the network to place an emergency call. The NDRT may carry information specific to the classification of the responding NPWTRU.

One example of the classification of the WTRU is the suitability index that quantifies the responding NPWTRU. The suitability index may be derived based on the neighbor discovery policy. The NPWTRU may calculate the suitability index based on at least one of a plurality of input parameters including, but not limited to the following: its crosslink radio condition estimated based on received NDIT, traditional link (the link between a WTRU and a base station/relay) radio condition, battery status, hardware limitations, mobility, user subscription level, or willingness to help. These parameters may be weighted differently based on the neighbor discovery policy in generating the classification.

The suitability index may be embedded in the NDRT that is sent to the NSWTRU in the form of local broadcast transmission and used by the NSWTRU to select a helper WTRU candidate among responding NPWTRUs. Alternatively, the NPWTRU may send the suitability index to the eNB in an uplink control or data channel so that the network may select an HWTRU candidate for the NSWTRU and forward the information to the NSWTRU.

In addition to determining whether to send an NDRT, the neighbor discovery policy may dictate whether or not an NDRT may be sent upon detection of the NDIT, (i.e., "gate" the NDRT). The NDRT gating decision may be based on the received NDIT characteristics such as the NDIT type, the signal strength, the NDIT sequence signature, or the repetition of the NDIT. For example, when an NPWTRU in an RRC IDLE mode initially detects an NDIT, the NPWTRU may not send an NDRT and instead keep monitoring until a predetermined number of the same NDITs have been detected. The gating may reduce unnecessary transition between RRC idle and RRC connected states for the NDRT transmission.

For NDRT gating, the neighbor discovery policy may use the classification and certain pre-arranged information. For example, the NPWTRU may first calculate the classification and rank it within a pre-agreed scale. Depending on the ranking, the NPWTRU may send an NDRT upon first NDIT reception or after a predetermined number of NDIT receptions.

Alternatively, when detecting an NDIT during wake-up periods in an RRC idle mode, the NPWTRU may send a report to the network via an uplink channel using an RACH format and resources or broadcast a local NDRT without transitioning to an RRC connected mode. This may reduce signaling overhead associated with the state transitions.

Figure 10:
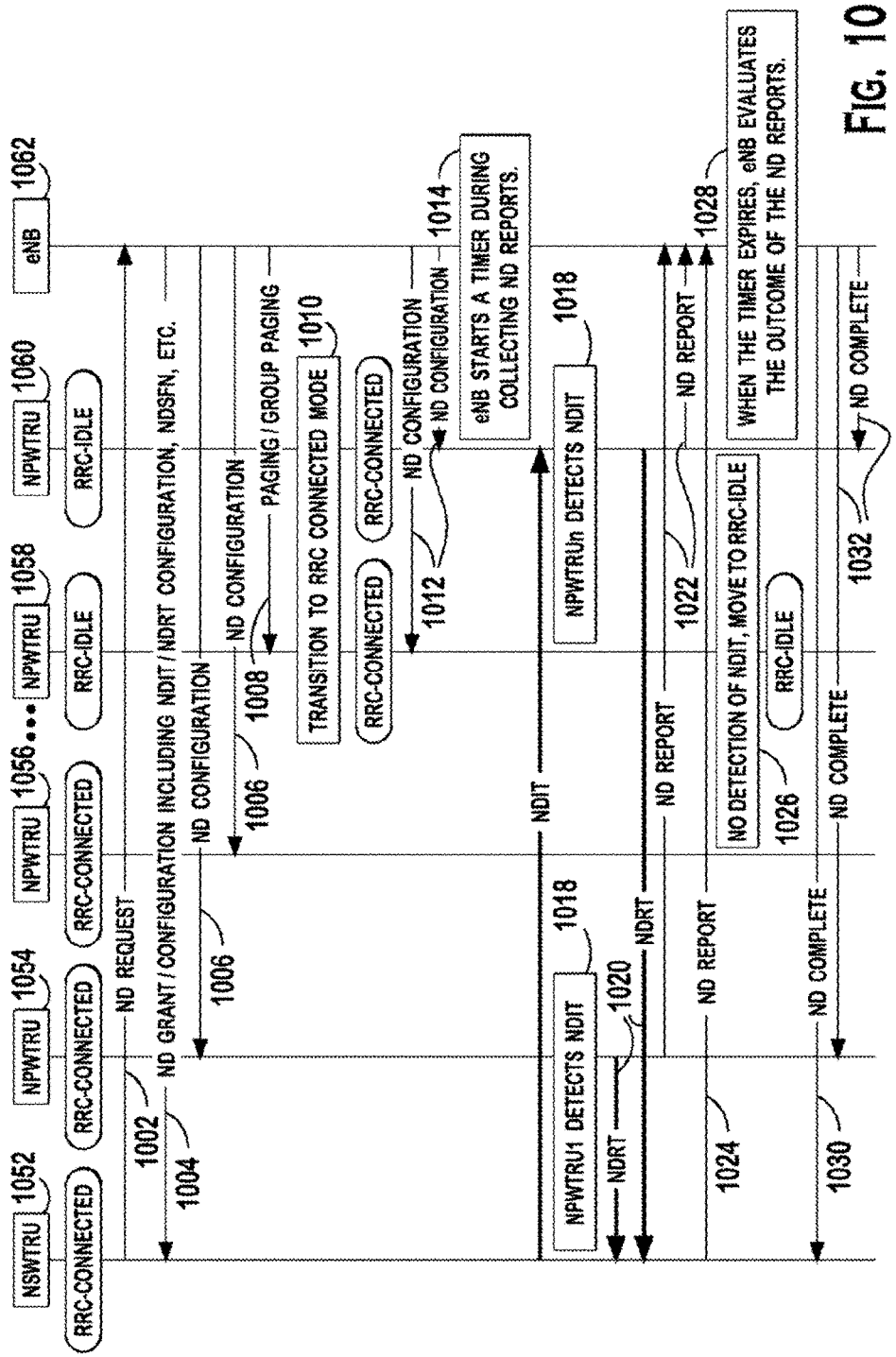
FIG. 10 is a signaling diagram of an example process for neighbor discovery with pre-grouping in accordance with one embodiment.

FIG. 10 is a signaling diagram of an example process 1000 for neighbor discovery with pre-grouping in accordance with one embodiment. WTRU 1052 takes the role of a NSWTRU and there are several WTRUs (NPWTRUs) 1054, 1056, 1058, 1060 in a predefined group. In this example, WTRUs 1054 and 1056 are in an RRC connected state and WTRUs 1058 and 1060 are in RRC idle state. The pre-grouping enables scheduling of the neighbor discovery procedure within the group.

NSWTRU 1052 may send a network discovery request to eNB 1062 to initiate the neighbor discovery procedure (1002). Any WTRU in the pre-defined group may be triggered to behave as an NSWTRU, for example, if triggered by the pre-defined event(s), if scheduled by the neighbor update period, if requested by the network, or the like. It may happen that two or more NSWTRUs may initiate the neighbor discovery process in the same radio frame in two adjacent proximity groups. However, the fixed transmission power level configured for the proximity group and centralized sequence planning of each proximity group may support that the two concurrent neighbor discovery processes in adjacent proximity groups proceed with minimum mutual interference.

NPWTRUs 1054, 1056, 1058, 1060, may be either members of the proximity group or the target group associated with NSWTRU 1052. NSWTRU 1052 may be associated with a number of target groups and the neighbor discovery may be specific to one target group or a set of target groups at one time. The target group information specific to the neighbor discovery may be included in the neighbor discovery request from NSWTRU 1052.

The eNB 1062 may deny the neighbor discovery request under certain conditions (e.g., overload in the system). In that case the neighbor discovery grant may include instructions regarding resending the neighbor discovery request, (e.g., back-off period for the next neighbor discovery request).

Once the neighbor discovery is granted, the eNB 1062 sends neighbor discovery grant and configuration including the NDIT and NDRT, a neighbor discovery system frame number (NDSFN), or the like to NSWTRU 1052 (1004). The eNB 1062 may also send the neighbor discovery configuration to WTRUs that may participate in the neighbor discovery procedure (i.e., WTRUs 1054, 1056, 1058, 1060 in this example) (1006). Since the WTRUs 1058, 1060 are in an RRC idle state, the eNB 1062 may send a paging (or group paging) message to WTRUs 1058, 1060 (1008). The WTRUs 1058, 1060 transition to the RRC connected state (1010), and receive the neighbor discovery configuration from the eNB 1062 (1012). In this case, the network prepares the upcoming neighbor discovery by transitioning each member WTRUs of the pre-group to the RRC connected mode. Alternatively, the NPWTRUs 1058, 1060 may remain in an RRC IDLE mode and send a local NDRT as disclosed above. The NSWTRU 1052 may then collect received local NDRTs and send a neighbor discovery report to the network. By doing this the responding NPWTRUs may not have to transition to the RRC connected mode.

The configuration provided by the eNB 1062 may include details necessary to detect the transmissions of the NDIT and NDRT and perform the neighbor discovery process. The configuration may include the timing of the transmissions in terms of the NDSFN, the duration of the neighbor discovery process, the frequency resource allocation for the NDIT and NDRT transmissions, the sequences applied for the NDIT and NDRT transmissions in terms of the base sequence number and cyclic shift (ZC-based sequence), the transmit timing of the NDIT relative to the downlink frame start, etc.

The eNB 1062 may start a timer for collecting neighbor discovery reports (1014). NSWTRU 1052 sends an NDIT (1016). Each NPWTRU that has detected the NDIT from NSWTRU 1052 may send an NDRT to NSWTRU 1052. In this example, NPWTRUs 1054, 1060 detect the NDIT (1018), and may send an NDRT to NSWTRU 1052 (1020), and may also send a neighbor discovery report to the eNB 1062 (1022). NSWTRU 1052 may send a neighbor discovery report to the eNB 1062 (1024). NPWTRU 1058 detects no NDIT and moves to an RRC idle state (1026). When the timer expires, the eNB 1062 evaluates the outcome of the neighbor discovery (1028). The eNB 1062 may send a neighbor discovery complete message to NSWTRU 1052 to inform a list of discovered NPWTRU identities, for example that are suitable for subsequent operations (1030). The eNB 1062 may decide which of the NPWTRUs discovered through the process may be identified as neighbors to NSWTRU 1052. The eNB 1062 may also send a neighbor discovery complete message to participating NPWTRUs 1054, 1060 (1032). The neighbor discovery complete message may include information necessary to establish or update a neighbor list for the NSWTRU and NPWTRUs. The eNB 1062 may send the complete message to the NSWTRU and the NPWTRU(s) that is selected as an HWTRU candidate. The other participating NPWTRUs may apply a timer and conclude the neighbor discovery process when the timer expires.

The NDRT may carry the identity of NPWTRU explicitly or implicitly in order for the NSWTRU to discern multiple responding NPWTRUs. The NDRTs from NPWTRUs may be transmitted simultaneously and may be distinguished, for example, with a unique cyclic shift of the same ZC-based base sequence, which is informed in the neighbor discovery configuration message. The NSWTRU may report detected values of the cyclic shift to the eNB, and the eNB may determine the NPWTRU identity based on the reported cyclic shift values. Alternatively, the NDRTs may be transmitted at different time instances using the same or different sequences. The NSWTRU may keep detecting the NDRT for a configured period of time, log the time instances of detected NDRT transmissions, and report those values to the eNB for NPWTRU identity determination. In either case, there may be a time window for the NSWTRU to detect the NDRT with a pre-determined delay relative to the NDIT transmission.

Alternatively, the NPWTRUs that detected the NDIT may not transmit an NDRT and instead send a report to the eNB via an uplink channel following detection of the NDIT. The NPWTRUs may just indicate detection of the NDIT in the report to the eNB.

The NDIT and the NDRT may be transmitted at a fixed and pre-determined power level and the NPWTRU and the NSWTRU may calculate the path loss upon detecting the NDIT and the NDRT, respectively. The path loss may be reported to the eNB.

The neighbor discovery request, grant, configuration, report, and complete messages may be carried over a combination of physical layer signaling and RRC level signaling. For example, the neighbor discovery grant may be sent as a one-bit field with a new downlink control information (DCI) format coupled with a cell radio network temporary identity (C-RNTI) or a new RNTI (i.e., a neighbor discovery RNTI) transmitted in a physical downlink control channel (PDCCH). Alternatively, the configuration may be packed into a new DCI format. The neighbor discovery request and the neighbor discovery report may be transmitted either explicitly in uplink control information (UCI) or implicitly in a way similar to the scheduling request (SR). Alternatively, RRC signaling may be used to broadcast the common neighbor discovery configuration for pre-grouped WTRUs.

Embodiments for informing and scheduling NPWTRUs in an RRC idle mode for the neighbor discovery occasions are disclosed hereafter. For example, the gain is proportional to the availability of the helper WTRUs, (i.e., potential candidates for the relay operation), selected from the NPWTRUs that are discovered in the neighbor discovery process. The more NPWTRUs are discovered and evaluated, the better helper WTRUs may be identified in terms of the radio link quality. The NPWTRUs, while in a DRX cycle, follow individually configured sleep and wake cycles and may exit the DRX cycle upon receipt of a paging message.

With the slotted scheduling, the neighbor discovery transmission may be scheduled in a specific SFN, (referred to as an NDSFN), that may be configured and signaled to the proximity or target group by the controlling eNB in connection with a neighbor discovery request. The NDSFN may be per proximity or target group and the neighbor discovery process may be contained in the NDSFN frame or multiple frames starting from the NDSFN. The number of frames starting from the NDSFN dedicated for the neighbor discovery may be configured. The neighbor discovery configuration (e.g., including the NDSFN) may be conveyed to NPWTRUs in a proximity or target group. This may performed using broadcast or paging signaling.

In case of paging, the network may page each WTRU in a DRX cycle individually and command its transition to an RRC connected mode for preparation of the upcoming neighbor discovery. This may cause a delay to the neighbor discovery since each NPWTRU has its unique paging frame (PF) and the neighbor discovery may not be configured until each upcoming PF arrives and each WTRU receives this information.

Alternatively, the network may perform group paging. A group paging mechanism may be defined based on the pre-grouping. The network may assign each NPWTRU into a proximity group or a target group, and each NPWTRU may be provided with a group ID (e.g., GROUP_ND_IMSI) for neighbor discovery purposes, which may be unique for each proximity or target group. A new NAS procedure may be defined or an existing NAS procedure may be extended to include new commands for group ID allocation, modification, or deletion. A neighbor discovery paging occasion (ND-PO) and a neighbor discovery paging frame (ND-PF) may be determined based on the group ID for neighbor discovery.

Alternatively, the network may apply a common DRX cycle per pre-group. For example, WTRUs belonging to the same pre-group may be waking up at the same time when DRX is configured. The network may assign the neighbor discovery configuration (e.g., including an NDSFN) during this common wake-up period.

Alternatively, a neighbor discovery common period (NDCP) may be applied in parallel to the regular DRX cycle of each individual WTRU. In this case, a WTRU when in DRX cycle may wake up both according to its regular DRX cycle and NDCP.

Upon a successful notification either via broadcast or paging, the NPWTRU in an RRC idle mode may transition to the RRC connected mode.

Figure 11:
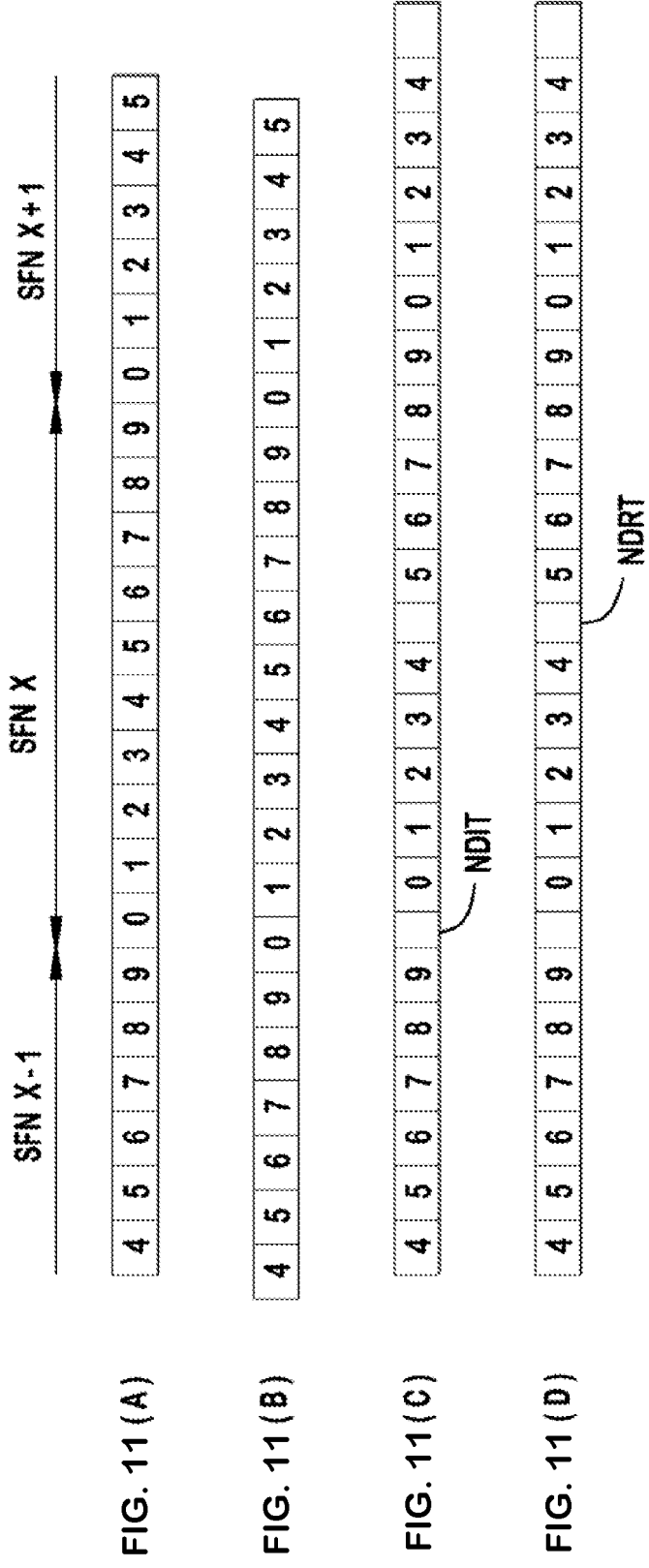
FIGS. 11(A) to 11(D) each show examples of timing relation between neighbor discovery initial transmission (NDIT) and neighbor discovery response transmission (NDRT) transmissions.

The neighbor discovery configuration may ensure that, during the NDSFN(s), NPWTRUs are ready to receive the NDIT. FIGS. 11(A) to 11(D) show an example of timing relation between NDIT and NDRT transmissions. FIG. 11(A) shows NSWTRU downlink receive timing, FIG. 11(B) shows NSWTRU uplink transmit timing, FIG. 11(C) shows NSWTRU NDIT transmit timing and NSWTRU NDRT receive timing, and FIG. 11(D) shows NPWTRU downlink receive timing and NPWTRU NDRT transmit timing.

The WTRU-to-WTRU synchronization may be assumed, and the maximum relative downlink receive timing misalignment between any pair of WTRUs caused by downlink propagation condition differences and round trip delay of the reference signal may be absorbed by a cyclic prefix and/or a guard period implemented in the NDIT and the NDRT.

This example assumes that one NDSFN is dedicated to the neighbor discovery process and within the NDFSN frame both NDIT and NDRT are transmitted in one sub-frame over a pre-defined set of resource blocks (RBs). The time required for receiving and processing the NDIT and NDRT may take, for example, about four sub-frames. In this example, processing related to the neighbor discovery at the NSWTRU and the NPWTRUs may be completed within the frame except the reporting and completion of the neighbor discovery procedure to which the normal LTE shared and/or control channel timing applies.

Although the example in FIGS. 11(A) to 11(D) shows sub-frame numbers, one or more of the sub-frames may be special sub-frames with a shortened length to make up for the NDZ as shown in FIGS. 8(A) to 8(C).

Referring to FIGS. 11(A) to 11(D), in the NDSFN, the NSWTRU sends the NDIT in the NDZ according to its downlink timing reference. The NDIT may be aligned with the downlink timing reference. The uplink transmissions of each WTRU is regulated by the uplink timing advance (TA) commanded by the network and if the NDIT and NDRT follow the uplink transmission timing of the NSWTRU and NPWTRU, respectively, the TA information may be conveyed in the configuration message. By aligning the NDIT and NDRT with the downlink timing reference, the transmit and receive time lines may be aligned without additional signaling overhead.

The NPWTRUs receive the NDIT in a configured sub-frame of the NDSFN that is pre-defined for neighbor discovery process. The NDIT and NDRT sub-frame may be configured differently. For example, the eNB may schedule the NDIT and NDRT in sub-frames where the traffic load is expected to be low.

Upon detection of the NDIT, the NPWTRUs may transition from receive to transmit if the NDIT and NDRT utilize the same band. The pre-grouping information (e.g., target group) may be embedded in the NDIT (e.g., with the help of different root sequences for the NDIT) and in that case the NPWTRU may extract this group information and compare with its own to determine if this neighbor discovery is intended for the group it belongs to. When the NPWTRU decides to transmit a NDRT, the NPWTRU may send the NDRT in a configured sub-frame of the NDSFN according to its downlink timing reference. The NDRT may be of the same type of transmission as the NDIT in terms of content, sequence type, power levels, etc.

Alternatively, the NPWTRUs may send a report to the eNB without responding to the NSWTRU. The NDRT grant (i.e., whether or not the NPUSs send a NDRT or a report to the eNB) may be included in the neighbor discovery configuration the NPWTRUs received from the eNB. The reporting to the eNB may occur in any sub-frame after the NDIT reception and before the end of the NDSFN. The report to the eNB may be carried via a PUSCH or a PUCCH (e.g., a new UCI field may be defined). The eNB may inform the NSWTRU of the results of this neighbor discovery via a PDSCH either in the NDSFN or the subsequent frames.

Following the transmission of the NDIT, the NSWTRU may schedule the reception of the NDRT in the configured sub-frame (e.g., according to the pre-defined timing offset between NDIT and NDRT, for example, 4 sub-frames). The NSWTRU may transition to a receive mode if the NDIT and NDRT use the same band. The NSWTRU may send the result of the NDRT reception to the eNB. The NSWTRU may finish the neighbor discovery process if the NDRT report is sent directly to the eNB for processing.

Figure 12A:
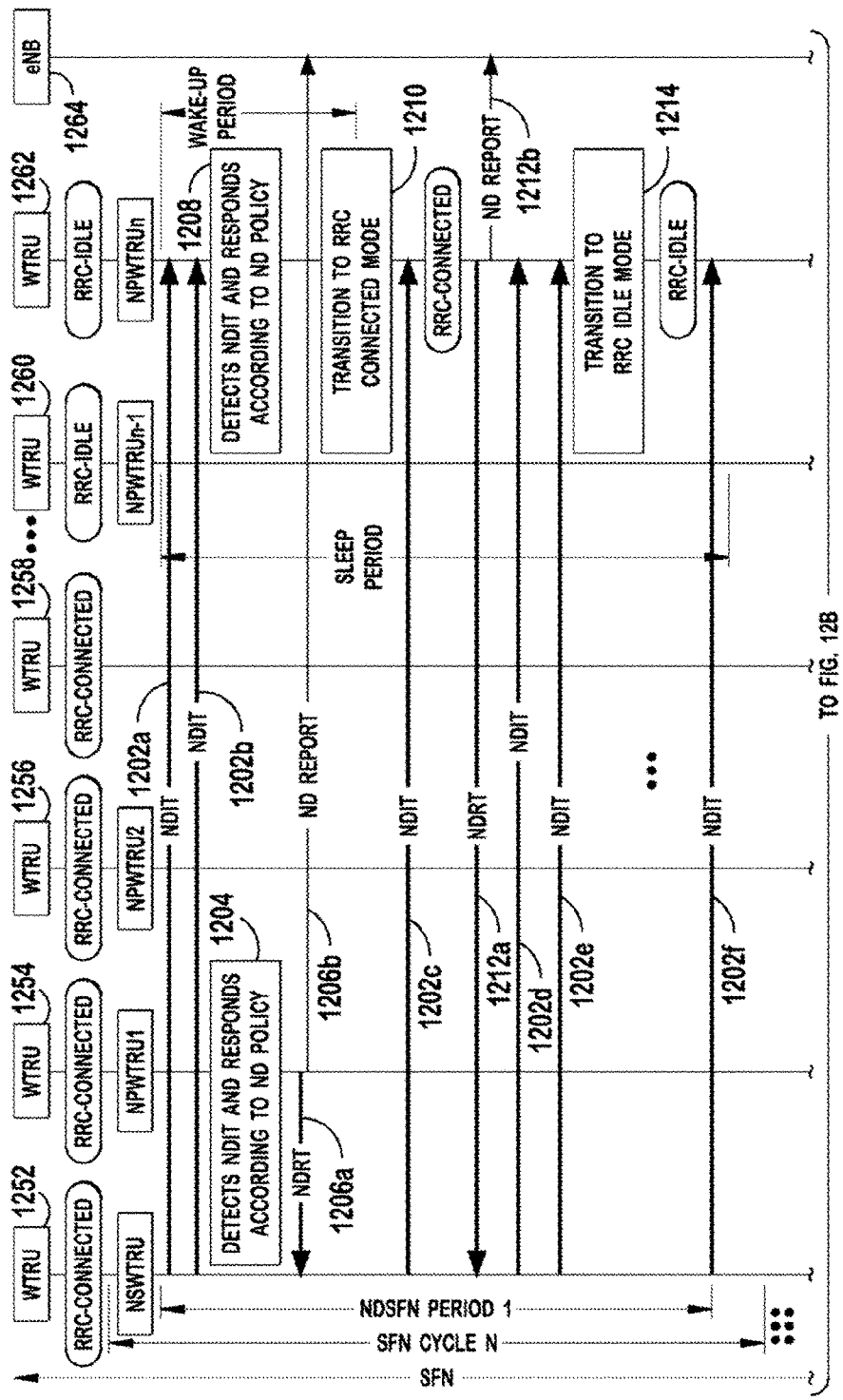

FIGS. 12(A) and 12(B) are a signaling diagram of an example process 1200 for neighbor discovery without pre-grouping in accordance with one embodiment. WTRU 1252 takes the role of an NSWTRU and there are several WTRUs 1254, 1256, 1258, 1260, 1262. In this example, WTRUs 1254, 1256, and 1258 are in an RRC connected state and WTRUs 1260 and 1262 are in an RRC idle state. Any WTRU may take the role of NSWTRU if triggered by a pre-defined event(s), scheduled by a neighbor update period, requested by the network, or the like. WTRUs in an RRC connected state may take the role of NPWTRU according to the neighbor discovery policy and may monitor an NDZ for an NDIT. WTRUs in an RRC idle state may take the role of NPWTRU during the wake-up period as scheduled by the neighbor discovery policy and may monitor an NDZ for an NDIT. The neighbor discovery policy may also indicate that a WTRU may not take the role of an NPWTRU.

In this example, WTRU 1252 calculates an NDSFN and may transmit repeatedly an NDIT (e.g., periodically) in the configured NDSFN period (in the NDZ of NDSFN frame(s) during NDSFN period 1) (1202a-1202f). WTRU 1254 detects the NDIT from WTRU 1252 (1204) and responds according to the neighbor discovery policy. WTRU 1254 may send an NDRT to WTRU 1252 (1206a) and/or a neighbor discovery report to eNB 1264 (1206b).

WTRU 1262 in an RRC idle state detects the NDIT during the wake up period and responds according to the neighbor discovery policy (1208). WTRU 1262 may transition to an RRC connected state (1210), and send an NDRT to WTRU 1252 (1212a) and/or send a neighbor discovery report to eNB 1264 (1212b). WTRU 1262 may then transition back to an RRC idle state (1214). In this example, WTRU 1254 may not receive the NDIT transmissions, WTRU 1256 may not take the role of NPWTRU according to the policy, and WTRU 1260 may not receive the NDIT transmissions since it is in a sleep state.

In the next NDSFN period, WTRU 1252 may transmit an NDIT repeatedly (e.g., periodically) in the configured NDSFN period (1218a-1218g). WTRU 1258 may take the role of NPWTRU according to the neighbor discovery policy, (e.g., battery charged) (1216). WTRU 1258 detects the NDIT and responds according to the neighbor discovery policy (1220). WTRU 1258 may send an NDRT to WTRU 1252 (1222a) and/or send a neighbor discovery report to eNB 1264 (1222b).

WTRU 1260 in an RRC idle state detects the NDIT during the wake up period and responds according to the neighbor discovery policy (1224). WTRU 1260 may transition to an RRC connected state (1226), and send an NDRT to WTRU 1252 (1228a) and/or send a neighbor discovery report to eNB 1264 (1228b). eNB 1264 may send a neighbor discovery complete message to WTRU 1252 to complete the neighbor discovery procedure. In case eNB 1264 receives a neighbor discovery report from the NPWTRUs, eNB may also send a neighbor list to WTRU 1252. In case NPWTRUs send an NDRT to WTRU 1252, WTRU 1252 may generate the neighbor list based on the NDRT.

When a WTRU reads a PDCCH on the traditional link (a link between a WTRU and an eNB) and is not in the role of NSWTRU on the cross link (a link between WTRUs), the WTRU may take the role of NPWTRU according to neighbor discovery policy. The neighbor discovery policy may indicate that a certain WTRU may not take the role of NPWTRU, (for example, a TWTRU may not take the role of NPWTRU, or a WTRU whose battery level is below a threshold may not take the role of NPWTRU). In each frame and in each cell the network may have knowledge of which WTRUs are NSWTRUs and NPWTRUs, how the NDITs are configured, etc. The network may keep control of the neighbor discovery processes and maintain a neighbor list for each WTRU.

The NSWTRU may repeatedly broadcast an NDIT and monitors for NDRTs in the NDZ during NDSFN frames. The NSWTRU may monitor the NDRT to determine the intensity of responses to control the neighbor discovery procedure. The NDRTs from different NPWTRUs but of the same type may be identical and may appear at the NSWTRU as multipath versions of one signal, which allows the NSWTRU to evaluate the number of responses based on the received NDRT strength. The NSWTRU may also monitor the NDRT to identify the responding NPWTRUs. In the case that the NDRT carries WTRU identity information, the NSWTRU may correlate the NDRT with a set of different base sequences to extract the WTRU identity information.

The NPWTRUs monitor the NDIT and upon detection may broadcast an NDRT and may send a report to the eNB including the detected WTRU signature. The NDRT may include the path loss derived from the pre-defined NDIT power level and detected strength of the NDIT.

The parameters for controlling the neighbor discovery process may be cell-specific. When attaching to a cell, a WTRU may read the neighbor discovery parameters from the system information blocks (SIBs). The neighbor discovery parameters include the NDZ. The NDZ is a cell-specific pre-allocated frequency and time resources dedicated for NDIT and NDRT. The NDZ may be common for WTRUs in a cell in connection with cross link bandwidth configuration. In each frame an NDZ may be pre-defined and standardized in terms of time and frequency. For example, the duration may be the first symbol of sub-frame 0.

The neighbor discovery parameters may also include neighbor discovery power setting, which may be a cell-specific fixed level broadcast in the system information to adjust the desired neighbor discovery radius from the NSWTRU according to the operation statistics such as the user density, traffic load, interference rise, etc. With the knowledge of the NDIT power level, the NPWTRU upon detection of the NDIT may derive, and report, the path loss.

The neighbor discovery parameters may also include neighbor discovery base sequence, which may be cell-specific base sequences planned for NDIT and NDRT to provide WTRU signature and neighbor discovery types. One or more base sequences may be reserved for WTRUs not associated with the network (e.g., in a coverage extension mode) and this base sequence index and related configuration may be stored in a WTRU.

The neighbor discovery parameters may also include cyclic shift size, which is used to derive cyclic shifted sequences off the same base sequence to help distinguish different NDITs at the same resource allocation.

The neighbor discovery parameters may also include initial NDSFN period duration, which is the number of consecutive frames in which the NSWTRU sends an NDIT in the first SFN cycle when a neighbor discovery process starts. The duration of the initial period may be configured by the cell based on the cell user density. A higher density cell may apply a shorter initial NDSFN period, because more responses are expected from one NDIT.

The neighbor discovery parameters may also include an NDSFN period ramping step size, which is the number of frames the NDSFN period is extended in the next SFN cycle of one neighbor discovery process. When the NSWTRU may not receive adequate responses (i.e., NDIT), the NSWTRU may increase the NDSFN period with the ramping step size and continue the neighbor discovery in the next SFN cycle.

The neighbor discovery parameters may also include neighbor discovery update SFN cycle period, which is the number of SFN cycles between each neighbor discovery process initiated to update the neighbor list. When a WTRU is in an RRC connected mode, it may periodically update its neighbor list by confirming the existing neighbors and seeking new neighbors and this parameter determines how often this update is done.

The neighbor discovery parameters may also include an estimated NDRT counter, which is the number of NDRTs estimated to receive in response to the NDIT(s) by the NSWTRU for each NDSFN period. The NSWTRU evaluates the received NDRTs and estimates the number of NPWTRU who responded and if the estimated number exceeds this parameter, the NSWTRU may terminate the neighbor discovery and report this termination to the network. The counter value may be dimensioned based on the number of neighbors the neighbor discovery process supports, the cell user intensity, etc.

The neighbor discovery parameters may also include a neighbor discovery termination timer, which may be the number of SFN cycles within which a neighbor discovery concludes. The network may apply this timer to set the time period during which the neighbor discovery reports from NPWTRUs are collected.

Each WTRU upon registering with the network may calculate its NDSFN based on its unique identity WTRUID, (e.g., IMSI mod 1024). The WTRU may be permitted to initiate the neighbor discovery process as an NSWTRU by sending an NDIT in the specific symbol location (e.g., first symbol) of specific sub-frame (e.g., the first subframe) of each radio frame of a period starting with this NDSFN. This neighbor discovery occasion is referred to as "self-calculated NDSFN."

Each WTRU may be assigned a unique neighbor discovery signature that the network may derive from the WTRU's identity information such as IMSI. The WTRU signature is WTRU-specific and may be signaled via dedicated RRC signaling when the WTRU is first attached to the cell. The WTRU signature mapping with the WTRU identity may be maintained by the network. In case where the cross link bandwidth is larger than the minimum (e.g., 6 RBs) for the basic NDIT configuration, the network may use the extra RBs to create more WTRU signatures or neighbor discovery types.

The NSWTRU may start sending an NDIT(s) in each frame of the initial NDSFN period duration using the power level specified in the neighbor discovery power setting in the NDZ. The starting SFN of the period may be selected based on the origin of the neighbor discovery. When it is a periodical update, the NDSFN may be used as the starting frame. When it is commanded by the network, a fixed timing relationship may be standardized between the frame in which the command is received and the starting frame of the resulted initial NDSFN period. The NSWTRU may initiate, under the network control, a neighbor discovery in certain pre-defined situations, e.g., when exiting a DRX cycle. The network may, without request, assign an NDSFN so that the WTRU may not wait for the neighbor discovery associated with the self-calculated NDSFN. This neighbor discovery occasion is referred to as "network-commanded NDSFN."

In addition to the NDSFN, each WTRU may calculate an NDIT sequence index based on the WTRU ID and system parameters. In the case of network-commanded neighbor discovery, the NDIT sequence index may be provided along with the NDSFN. This index is used to distinguish multiple WTRUs that send NDITs in the same frame. The probability of multiple WTRUs initiating the neighbor process in the same frame and using the same sequence index is relatively small for short NDSFN periods, but as the NDSFN period increases, (i.e., more frames are occupied by the NDIT from one NSWTRU), the probability of collision may increase.

The possible NDIT sequences may be derived from one type of base sequence (e.g., ZC base sequence) that provides good autocorrelation and cross correlation features. The base sequence may be cell-specific and broadcast in the system information across the cell and as a result, when NPWTRUs detect an NDIT with the help of the base sequence, the sequence index may be determined. The length of the NDIT sequence may dictate how many RBs are used in the NDZ.

In the end of the initial NDSFN period, the NSWTRU may estimate the responses and compare the number with the estimated NDRT counter. If the number is below the estimated NDRT counter, the NSWTRU may continue the neighbor discovery and start another NDSFN period in the next SFN cycle. The length of the NDSFN may be increased by the NDSFN period ramping step size.

For NPWTRUs in a DRX cycle (both in RRC_IDLE and RRC_CONNECTED modes) the monitoring of the NDZ occurs on the WTRU-to-WTRU link during the wake-up period. The detection of NDIT is possible when the NDSFN period overlaps with the wake-up period. The probability of such event may determine the exhaustiveness and the speed of the neighbor discovery process.

The NSWTRU may continue the NDSFN period in each consecutive SFN cycles until the number of accumulated SFN cycles reaches the neighbor discovery termination timer. The timer value may be set by the network and signaled to the WTRU. When the estimated NDRT exceeds the estimated NDRT counter, the NSWTRU may terminate the neighbor discovery before the timer expires.

Upon a successful detection of the NDIT, the NPWTRUs may send a report (including the sequence index and the SFN of the frame) (with or without path loss or the NDIT strength) to the eNB, for example, through a PUSCH or a PUCCH. The detection may be reported within the same frame. Because the network administers the self-calculated SFN and the network-commanded SFN, the network may identify the NSWTRU based on the reporting of the detected NDIT combined with the SFN in which the report is received. The network may also derive the path loss based on the neighbor discovery power setting if the NDIT strength is reported.

For NPWTRUs in a DRX cycle (both in RRC_IDLE and RRC_CONNECTED mode) the monitoring of the neighbor discovery zone is required on the WTRU-to-WTRU link during the wake-up period when PDCCH monitoring occurs on the eNB-to-WTRU link. The detection of NDIT is possible when the NDSFN period of the NSWTRU overlaps with the wake-up period. Since there is no uplink grant available for NPWTRUs in a DRX cycle, the reporting may not occur shortly following the detection and the NPWTRU may transition to the RRC connected mode to transmit the NDRT and report to the network. Alternatively, an NPWTRU upon detection of the NDIT during a wake-up period of its DRX cycle may not transition to the active state and either report the detection to the eNB or send a NDRT.

The neighbor discovery policy with regard to the response to the NDIT may be enforced by the network and may be standardized. For example, the NDIT using a base sequence reserved for emergency call may be replied regardless of the NPWTRU's battery level or other suitability metrics that may prevent it from responding otherwise.

Neighbor discovery without pre-grouping reduces the amount of related signaling overhead. Neighbor discovery has an inherent pre-grouping with the group being WTRUs associated with one cell. To seek neighbors associated with a different cell, the NPWTRU may repeat the attempt to detect the NDIT by using a number of timing and frequency synchronization settings. The first setting may be of its own serving cell and the rest of setting may be of its neighbor cells. The setting of the neighbor cells may be available to support neighbor cell measurement. A WTRU typically tracks the timing and frequency of a set of neighbor cells to demodulate the cell specific reference signals. In case that two NPWTRUs report to two different eNBs regarding the detection of the same NSWTRU, inter-eNB communication and coordination may be performed.

When an NPWTRU manages to detect an NDIT from an NSWTRU in the neighbor cell, the frame in which the NDIT detection occurs may not be the same as the SFN used by the NSWTRU due to the SFN-SFN differences between cells. Without correct SFN information, the NSWTRU may not be identified. SFN-SFN difference measurement of neighbor cells may be applied to solve this problem. In case of cooperative multipoint (CoMP) where SFN of different eNBs are synchronized, the NDIT detection may be used to discover a neighbor in a neighbor cell. However, to use the NDIT detection report, the neighboring cells may exchange neighbor discovery information. If the two cells are at different eNB, the information may be exchanged on the X2 interface.

The NDSFN period may be flexible and adjusted dynamically based on the neighbor discovery progress. an NSWTRU may start with a relatively small value of the NDSFN period and if the number of neighbor responses are adequate, (e.g., in a crowded stadium), the same value may be used for the next SFN cycle. However, if the neighbors found are not satisfactory, the NDSFN period may be increased to accelerate the process. The downside is the increased probability of collision and increased interference. To solve this problem, the eNB may provide coordination since it is aware of which WTRU in the SFN cycle is the NSWTRU and the possible collisions based on the overlapping NDSFN frames and the NDIT sequence indices. The eNB may adjust the NDSFN period based on the neighbor discovery report and this adjustment may be made once per SFN cycle. Alternatively, the NSWTRU may adjust the NDSFN period autonomously based on the received responses.

Embodiments for neighbor discovery in a cold start case are disclosed hereafter. The cold-start case refers to the case when a WTRU fails to find any cell to attach to upon power up. In this case, the WTRU may not have any previous neighbor list to establish a link with a neighbor WTRU through which the network connection may be attained. This WTRU may be operating off a very different timing and frequency from those used by the surrounding WTRUs. Being invisible, this WTRU may actively broadcast its existence and solicit neighbors.

In one embodiment (NPWTRU search approach), the WTRU may take the role of NSWTRU and start neighbor discovery process. In this case, synchronization, pre-grouping, scheduling, or the like may not be available to the WTRU and the neighbor discovery process may rely on a set of pre-defined protocols that WTRUs execute without network instruction or involvement.

The procedure in this embodiment resembles the cell search procedure. The cell search finds and acquires synchronization both in time (slot and frame boundary) and in frequency with a cell and subsequently receives and decodes physical layer cell identity and other system cell information encoded in the master information block (MIB) such as system bandwidth, SFN, HARQ indicator channel (HICH) configuration, etc. The NSWTRU in cold-start may send beacons for NPWTRUs to search and synchronize with.

Upon failure to camp on any cell (may include all RATs), the WTRU may initiate a broadcast mode as NSWTRU and send an NDIT. Since NPWTRUs do not have knowledge as to when to receive the NDIT, the NDIT serves similar purposes as primary synchronization signal (PSS) and secondary synchronization signal (SSS) do in the LTE cell search procedure. NPWTRUs may perform a more complicated NDIT search beyond the NDZ.

Since the PSS in LTE is located in the last symbol of the first and eleventh slots of each radio frame, cell search requires a complete 5 ms search for the PSS by performing the correlation of the three known PSS sequences. The NDIT search in the cold start case may not require any WTRU to continuously operate a similar procedure for the purpose of chancing upon a neighbor NSWTRU's NDIT.

The NDIT search in the cold-start case may progress in two stages. The procedure of the first stage is as in embodiment for neighbor discovery without pre-grouping described above, and WTRUs in every frame except its own NDSFN search for a pre-defined sequence in the NDZ. In addition, an NDIT search trigger sequence is introduced that may be a ZC-based sequence of a different base or different cyclic shift of the same base sequence. If any NPWTRU detects this specific sequence, the second stage of NDIT search proceeds with a pre-defined cell search like procedure.

An NSWTRU transmits the NDIT continuously in the first stage. The neighbor discovery zone defined for WTRUs associated with a cell may lie in particular symbol location of particular sub-frame of each radio frame, but the NSWTRU is not associated with any cell and thus has no common perception of this zone. Consequently, when an NPWTRU detects an NDIT search trigger sequence in the NDZ, the NPWTRU cannot assume that the symbol location is registered the same at the NSWTRU.

The NSWTRU may transmit the NDIT search trigger sequence in each SC-FDMA symbols at the same location in the frequency domain as that of the NDZ.

When an NPWTRU detects the NDIT search trigger sequence in the NDZ, the NPWTRU automatically proceeds with the second stage. The second stage transmission may be transmitted concurrently with the first stage transmission at a different RB location. In other words, the first stage and the second stage transmissions may be multiplexed in the frequency domain.

The second stage transmission may reuse the LTE cell search PSS and SSS structure. A PSS-like sequence (e.g., ZC-based sequence) may be used to identify 5 ms timing of the NSWTRU. A set of SSS-like sequences (e.g., M-sequence) may be used to find the 10 ms timing of the NSWTRU. A temporary WTRUID built in the sequences may be used to distinguish the NSWTRU in the subsequent NPWTRU reporting to the eNB. Multiple NSWTRUs may initiate the process simultaneously and when it occurs the NPWTRUs may find them in a similar way as WTRUs in the cell search process find detectable cells (e.g., correlation peaks detected above a certain threshold). To distinguish these NSWTRUs, a uniquely selected temporary WTRUID may be applied similar to the cell group ID derived from the PSS and SSS. Timing offset and carrier frequency offset may be estimated from the PSS-like sequence. The path loss may be calculated based on a pre-defined NDIT power and the received signal strength.

When a NPWTRU detects a temporary WTRUID(s), the NPWTRU may report the search result to the eNB. The eNB then sets a timer for each reported WTRU ID starting from the first report. When a NPWTRU is in a DRX cycle, the NDIT search is triggered by the detection of the first stage during the wake-up period. Proceeding to the second stage may lead to the NPWTRU exiting the DRX cycle. Thus the timer is set to allow as many NPWTRUs as possible to detect the NSWTRU while assuring the NDIT transmission may not significantly drain the battery of the NSWTRU.

When the timer expires, the eNB may evaluate NPWTRUs that report on the same NSWTRU and decide, based on a number of factors, which ones may establish a radio relay link with the NSWTRU. A complete message may be sent to the NPWTRU(s) to start the association process. The association transmission may occur in the pre-designated resources where the NSWTRU monitors responses to the NDIT. The NSWTRU may conclude the NDIT when receiving no association transmission in a pre-defined period of time or receiving a pre-defined number of NPWTRU responses.

The association transmission requires the NPWTRU to synchronize with the NSWTRU using the timing and frequency offset estimated earlier. Following the association, the NPWTRU as a HWTRU may send reference signals to the NSWTRU as a TWTRU so that the NSWTRU synchronizes with the NPWTRU and aligns itself with the network timing. This may facilitate the relay of network information and data through the NPWTRU to the NSWTRU.

The common DRX mechanism may be implemented in the cold-start case. With a common DRX configured for a group of WTRUs, they may detect the NSWTRU in a coverage hole almost simultaneously and may reduce the processing time. With the common DRX, the latency of the neighbor discovery process is deterministic. The common DRX cycle somehow converts the NDIT/NSWTRU search into a group action.

In another embodiment, the NSWTRU in the coverage hole may search for the NDIT from NSWTRUs (NSWTRU search approach). The NDIT may carry a fixed pattern sequence for this purpose. The neighbor discovery configurations and protocol is pre-defined and stored in the WTRU.

Figure 13:
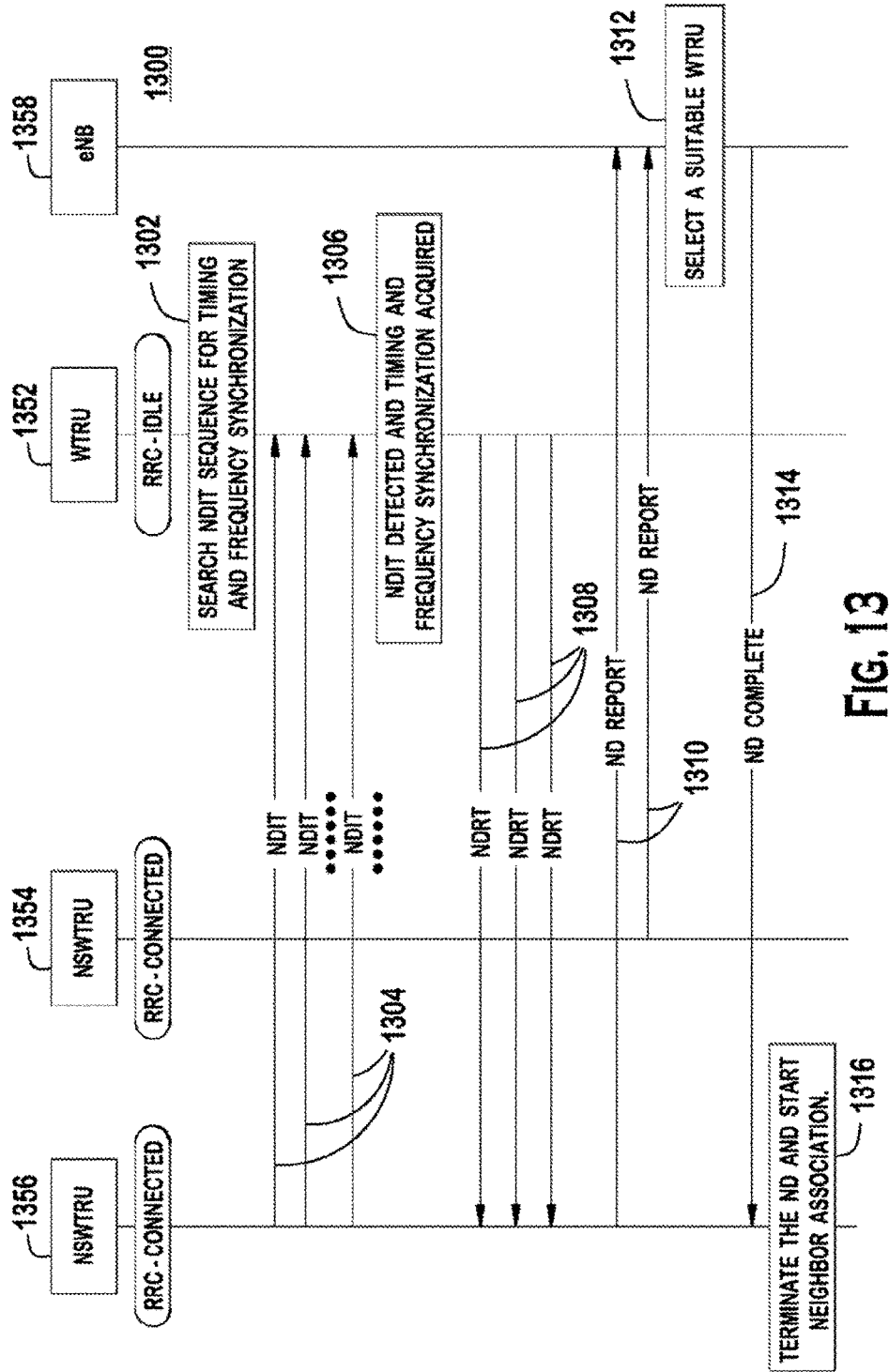
FIG. 13 is a signaling diagram of an example neighbor search process in accordance with the neighbor seeking WTRU (NSWTRU) search approach in a cold-start case.

FIG. 13 is a signaling diagram of an example neighbor search process 1300 in accordance with the NSWTRU search approach in a cold-start case. In this example, WTRU 1352 is in a coverage hole, and there are two WTRUs 1354, 1356 that become NSWTRUs with overlapping NDSFN period.

WTRU 1352 searches for an NDIT for timing and frequency synchronization (1302). WTRU 1352 acts like an NPWTRU in a sense that it attempts to detect an NDIT. Unlike an NPWTRU that has synchronization and timing of the NDIT for detection, WTRU 1352 searches for the NDIT using the default knowledge of the NDIT fixed sequence in terms of the periodicity, sequence index, etc. A search window may be applied.

WTRUs 1354, 1356 send an NDIT (1304). The NDIT comprises a fixed pattern sequence and a WTRU-specific ZC sequence. Since the fixed pattern sequence is the same for WTRUs, this detection may not convey any information regarding the identity of the sender of the NDIT.

WTRU 1352 detects the NDIT and acquires timing and frequency synchronization (1306). WTRU 1352 may detect multiple NDITs, because it is possible that multiple NSWTRUs may simultaneously send an NDIT.

WTRU 1352 sends a special NDRT using a base sequence reserved for the WTRU in cold-start (1308). The special NDRT may carry the information indicating a WTRU in a coverage hole. The NDRT that WTRU 1352 sends may be heard by multiple WTRUs. WTRU 1352 may send NDRT repeatedly and in the same time may monitor the neighbor association resource area for upcoming association.

WTRUs that sent the NDIT and detected the special NDRT may send a report to the network informing the detection of the special NDRT (1310). The eNB then selects a suitable WTRU for WTRU 1352 (1312) and send a neighbor discovery complete message (1314). The eNB may set a timer to collect such reports to have multiple responses among which it may select the best helper. Alternatively, the eNB may assign the WTRU who first reports as the helper. When receiving the neighbor discovery complete message, the selected WTRU terminates the neighbor discovery process and starts neighbor association with WTRU 1352 in the coverage hole (1316).

As the neighbor discovery in this embodiment is conducted among NSWTRUs, this embodiment limits the discoverable neighbors to the WTRUs in an RRC connected mode. No WTRUs in a DRX cycle may be available for the out-of-coverage WTRU.

Alternatively, instead of responding with an NDRT after synchronization, the WTRU in a coverage hole may send an NDIT and perform the procedure for the embodiment for neighbor discovery without pre-grouping described above. In doing that, the out-of-coverage WTRU may find a neighbor in the WTRUs in DRX cycles.

A WTRU may detect a radio link failure in an RRC_CONNECTED mode or a cell reselection may fail to find any cell in an RRC_IDLE mode.

A WTRU monitors the downlink radio link of its serving cell both in and out of DRX based on the estimated link quality of the cell-specific reference signal. Two thresholds, $Q_{in}$ and $Q_{out}$, are applied in the monitoring to determine the events of in-sync and out-of-sync, respectively. Out-of-sync indication reported by the physical layer means the downlink radio link cannot be reliably received (the level corresponds to 10% block error rate (BLER) of a hypothetical PDCCH transmission taking into account the PCFICH errors).

When a WTRU is not in DRX, the physical layer estimates the quality every 200 ms and if the result is worse than $Q_{out}$ the physical layer sends an indication to the higher layer. When a WTRU is in DRX, the evaluation period depends on the DRX cycle length. Upon receiving a pre-defined number of consecutive out-of-sync indications for the serving cell, higher layers may start a timer that is used to evaluate if the link quality may recover and if that is not the case and the timer expires, higher layers detect a radio link failure.

Upon detection of the radio link failure, the WTRU may initiate RRC connection re-establishment which entails a sequence of steps including cell selection. An initial cell selection and a stored information cell selection may be performed. The failure of RRC connection re-establishment may prompt the WTRU to leave the RRC_CONNECTED mode with release cause "RRC connection failure" and enter an RRC_IDLE state. In conjunction with this state transition, the WTRU performs cell selection.

In the end of this procedure, a WTRU might have different timing and frequency references from the ones it had at the time the radio link failure was declared. As a result, any neighbor discovery initiated may be no different from the one for the cold-start case. The attempt to leverage the neighbor list maintained before the radio link failure may be more successful at earlier stages when the timing and frequency references of the WTRU is still close to those of the WTRUs on the neighbor list.

In one embodiment, each WTRU may maintain a neighbor WTRU list both in and out of DRX, and may establish a connection with another WTRU for relay operation. To implement the WTRU relay connection using the existing neighbor list in handling the radio link failure, a "snapshot" of the physical layer runtime parameters pertaining to timing and frequency synchronization including a set of register values for automatic frequency control (AFC), temperature control crystal oscillator (TCXO), first significant path (FSP), radio interface variables, etc. that collectively and uniquely denote the last known synchronized state of the physical layer may be recorded and saved.

The WTRU may restore to the state when it was still synchronized with the WTRUs on the neighbor list. The saved parameters may be applied when the operator initiates a WTRU relay connection with the help of the neighbor list. Once the saved parameters are applied and the state is restored successfully, a neighbor discovery process without pre-grouping may be triggered and executed.

When a cell reselection while a WTRU is in RRC_IDLE mode, the WTRU might not have timing and frequency synchronization with the neighbors on the neighbor list after the period of DRX. Accordingly, the WTRU may start the neighbor discovery process as in the cold-start case.

Embodiments for neighbor discovery with a listening-based scheme are explained hereafter. The listening-based scheme may not require dedicated transmissions for the neighbor discovery process. Instead an NSWTRU may detect and process the uplink transmissions (e.g., SRS transmissions) of NPWTRUs and derive the mutual path loss to determine the neighbor relationship. The eNB may coordinate that a measurement gap in the uplink transmission is scheduled for the NSWTRU for the listening period to avoid interference from its own uplink transmissions.

A WTRU in DRX periodically sleeps and wakes up. The DRX may occur both in an RRC_IDLE mode and an RRC_CONNECTED mode (short/long DRX). During the wake-up, the WTRU performs a number of tasks including reading a PDCCH, and making downlink measurements, but may not perform uplink transmissions. As a result, the listening-based embodiment may not discover NPWTRUs in DRX. Therefore, the WTRU may need a period of continuous listening to discover a satisfactory number of neighbors. To accelerate the neighbor discovery process, the eNB may coordinate a neighbor discovery common period (NDCP) on a number of pre-grouped WTRUs. The NDCP is disruptive to the DRX cycles and a WTRU may break the regular DRX cycle when necessary to comply with the NDCP.

The pre-grouping may be applied. The SRS listening scheme may be restricted to a proximity group determined by the eNB beforehand and thereby the signaling overhead involving exchanging SRS configuration is reduced.

The regular SRS transmission may be as specified in the LTE standards and the listening scheme may be facilitated by introducing a mechanism of primarily scheduling and coordinating a WTRU-to-WTRU measurement based on the SRS signal.

The listening scheme may be on-going continuously when a WTRU is not in DRX and generate a neighbor list with a pre-configured number of members gradually over a few SFN cycles. WTRUs involved in the neighbor discovery process may be associated with the same cell. The NSWTRU and NPWTRU terminology is loosely applicable in the listening scheme, because each WTRU is an NSWTRU and an NPWTRU at the same time and the SRS transmission occurs regardless of this aspect.

Each WTRU initiates the SRS transmission to its serving cell according to the configuration once attached and the network may process the SRS transmissions to form and maintain a proximity group. The SRS transmissions do not occur in RRC_IDLE or during DRX in RRC_CONNECTED mode. As a result, the proximity group updates are limited to the period when a WTRU is active.

Each WTRU when not in the DRX cycle or during the wake-up period of the DRX cycle performs WTRU-to-WTRU measurement on the SRS transmissions, for example, of member WTRUs of its proximity or target group. The measurement may be performed autonomously in the sense that the network may not request or terminate the measurement. The network provides to each WTRU the SRS configuration of the member WTRUs of the group including the WTRU-specific configuration parameters. With the cell-specific parameters shared by WTRUs of the same cell, a WTRU is aware of the set of available frequency domain resources and sub-frames where the SRS transmissions occur. To determine the exact sub-carrier and sub-frame location, the measuring WTRU may have WTRU-specific configuration parameters of each SRS transmission to be measured.

When a WTRU has the information required to make the WTRU-to-WTRU measurement, the WTRU may autonomously set up a schedule for the SRS measurement occasions of each member WTRU of the group. The measurement schedule may not coincide with its own SRS transmissions. The measurement frequency may be adjusted, for example, if the WTRU to be measured transmits a periodic SRS transmission every certain period but the WTRU-to-WTRU measurement may not occur at the same periodicity, the measurement may be scheduled less frequently. The scheduling of measurements may be dynamically adapted to the successful measurement on the SRS transmission. For example, if a particular SRS transmission is not detected, the scheduling may increase the measurement occasions.

When performing the WTRU-to-WTRU measurement on SRS transmissions, the NSWTRU may align the uplink receiver timeline to capture the SRS transmissions of the NPWTRUs. As specified in the LTE system, the SRS transmission timing follows the downlink frame timing plus the network commanded timing advance. The timing advance is signaled individually to each WTRU to compensate for the different propagation delays. The uplink propagation channels of the NSWTRU and the NPWTRU, which are in the same proximity group, may be similar and thus yield highly correlated timing advance values. Therefore, each WTRU may apply its own timing advance to detect the SRS transmissions of others.

The measurement of each SRS transmission results in a strength indicator for each measured WTRU and the measuring WTRU may apply a threshold to determine if the measured WTRU may be considered as a neighbor. The threshold setting may take into account the different SRS transmission power levels each WTRU in the proximity or target group applies during the measurement occasions. The SRS transmission power levels may be regulated according to the uplink power control mechanism. The network may update the desired SRS power levels per TTI based on the reported power headroom (on a PUSCH) or from the historic transmission power control (TPC) command record. The threshold may be set without knowledge of the instantaneous SRS transmission power of the neighbor WTRU, but rather based on the regulated SRS transmit power of its own SRS transmission. It may be assumed that given the closeness of the NPWTRU and the NSWTRU, the path loss between them and the eNB may be comparable. Therefore, the SRS transmission power levels may be close. A hysteresis may be configured.

With the threshold test results, which may include a rank metric indicating how far the measured strength is from the threshold, the measuring WTRU may determine whether or not the measured WTRU may be considered as a neighbor. The WTRU processes the result and updates its neighbor list accordingly. The WTRU may report the neighbor list periodically or on demand by the network. While the neighbor list is updated based on the SRS measurement performed in wake-up period of the DRX cycle, the WTRU may not report this change until it exits from the DRX cycle. The report may be sent in a PUSCH transmission.

Since the SRS listening-based scheme may not cover WTRUs in an RRC IDLE mode and WTRUs in DRX in an RRC CONNECTED mode, the eNB may command a NDCP to WTRUs of the same proximity or target group and transition the WTRUs to the RRC_CONNECTED mode for a period of SRS transmissions to update the neighbor list. The eNB may command it on a condition that an inadequate number of neighbors are reported.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A wireless transmit/receive unit (WTRU) for neighbor discovery, the WTRU comprising:
    a processor operatively coupled to a transceiver, the processor and the transceiver configured to search for a first synchronization signal to discover neighbor WTRUs for peer-to-peer communication;
    the processor and the transceiver configured to receive the first synchronization signal;
    the processor configured to generate a discovery report based on the received first synchronization signal; and the processor and the transceiver configured to send a discovery report signal carrying the discovery report to a base station.

2. The WTRU of claim 1, wherein the first synchronization signal includes a beacon for neighbor discovery.

3. The WTRU of claim 1, wherein the discovery report contains at least one neighbor WTRU identity.

4. The WTRU of claim 1, wherein the discovery report contains at least a portion of a time value.

5. The WTRU of claim 1, wherein the discovery report contains a counter value, wherein the counter value is based on a time source.

6. The WTRU of claim 1, wherein the first synchronization signal carries at least one of a discovery signal and a fixed pattern sequence used by WTRUs in a cell.

7. The WTRU of claim 1, further comprising:
the processor and the transceiver configured to receive a second synchronization signal; and
the processor and the transceiver configured to synchronize timing and frequency based on the received first synchronization signal and the received second synchronization signal.

8. A first wireless transmit/receive unit (WTRU) for neighbor discovery, the WTRU comprising:
a processor configured to generate a primary synchronization signal and a secondary synchronization signal, wherein collectively the primary synchronization signal and the secondary synchronization signal indicate an identification for device-to-device communication with the first WTRU;
the processor configured to generate a discovery signal; and
the processor operatively coupled to a transceiver, the processor and the transceiver configured to transmit the primary synchronization signal, the secondary synchronization signal and the discovery signal.

9. The WTRU of claim 8, further comprising:
the transceiver configured to receive discovery configuration information, wherein the discovery configuration information includes time intervals and resource blocks for the WTRU to transmit discovery signals, wherein the transmitted discovery signal is transmitted in at least one of the time intervals and resource blocks provided by the discovery configuration information.

10. The WTRU of claim 8, wherein the discovery signal is for use by a second WTRU to discover the first WTRU for device-to-device communications.

11. The WTRU of claim 8, wherein at least one of the primary synchronization signal and the secondary synchronization signal is a neighbor discovery initial transmission (NDIT).

12. The WTRU of claim 8, wherein the identification is a temporary WTRU identity.

13. The WTRU of claim 8, wherein the identification is a physical layer identity.

14. The WTRU of claim 8, wherein the primary synchronization signal is transmitted in two adjacent single-carrier frequency division multiple access (SC-FDMA) symbols in a single subframe.

15. The WTRU of claim 8, wherein the secondary synchronization signal is transmitted in two adjacent SC-FDMA symbols in a single subframe.

16. A first wireless transmit/receive unit (WTRU) for neighbor discovery, the WTRU comprising:
a transceiver configured to receive a primary synchronization signal and a secondary synchronization signal from a second WTRU;
a processor operatively coupled to the transceiver, the processor configured to determine whether to associate with the second WTRU for device-to-device communications;
the transceiver configured to receive a discovery signal from the second WTRU;
the processor configured to generate a discovery report based on the received discovery signal; and
the processor and the transceiver configured to transmit the discovery report to a base station.

17. The WTRU of claim 16, wherein at least one of the primary synchronization signal and the secondary synchronization signal is a neighbor discovery initial transmission (NDIT).

18. The WTRU of claim 16, wherein the primary synchronization signal is transmitted in two adjacent single-carrier frequency division multiple access (SC-FDMA) symbols in a single subframe.

19. The WTRU of claim 16, wherein the secondary synchronization signal is transmitted in two adjacent SC-FDMA symbols in a single subframe.

20. The WTRU of claim 16, further comprising:
the processor and the transceiver configured to synchronize timing and frequency based on the received primary synchronization signal and the received secondary synchronization signal.

* * * * *